(12) United States Patent
Lee et al.

(10) Patent No.: US 7,599,166 B2
(45) Date of Patent: Oct. 6, 2009

(54) MULTILAYER CHIP CAPACITOR

(75) Inventors: Byoung Hwa Lee, Kyungki-do (KR); Hae Suk Chung, Seoul (KR); Dong Seok Park, Seoul (KR); Min Cheol Park, Kyungki-do (KR); Sang Soo Park, Kyungki-do (KR); Sung Kwon Wi, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 345 days.

(21) Appl. No.: 11/598,672

(22) Filed: Nov. 14, 2006

(65) Prior Publication Data

US 2007/0109717 A1 May 17, 2007

(30) Foreign Application Priority Data

| Nov. 17, 2005 | (KR) | ........................ 10-2005-0110394 |
| Oct. 11, 2006 | (KR) | ........................ 10-2006-0099092 |

(51) Int. Cl.
*H01G 4/00* (2006.01)
*H01G 4/005* (2006.01)

(52) U.S. Cl. ................................... 361/306.3; 361/303
(58) Field of Classification Search ................ 361/303, 361/305, 306.1, 306.2, 306.3, 309, 311
See application file for complete search history.

(56) References Cited

U.S. PATENT DOCUMENTS

| 5,880,925 | A | 3/1999 | DuPre et al. |
| 6,407,904 | B1 * | 6/2002 | Kuroda et al. ............... 361/303 |
| 6,441,459 | B1 | 8/2002 | Togashi et al. |
| 6,914,767 | B2 * | 7/2005 | Togashi et al. .............. 361/303 |
| 7,046,500 | B2 * | 5/2006 | Lee et al. .................... 361/303 |
| 7,262,952 | B2 * | 8/2007 | Lee et al. ................. 361/306.3 |
| 7,394,645 | B2 * | 7/2008 | Takahashi .................... 361/303 |
| 2004/1017932 | | 9/2004 | Togashi et al. |
| 2004/0207971 | A1 * | 10/2004 | Prymak et al. ........... 361/306.3 |
| 2007/0019364 | A1 * | 1/2007 | Roy ........................... 361/303 |

FOREIGN PATENT DOCUMENTS

| CN | 1261457 | 7/2000 |
| CN | 1530977 | 9/2004 |
| WO | WO 99/00807 | 1/1999 |

OTHER PUBLICATIONS

Chinese Office Action, with English Translation, issued in Chinese Patent Application No. CN 200610145204.X, dated Apr. 24, 2009.

* cited by examiner

*Primary Examiner*—Eric Thomas
(74) *Attorney, Agent, or Firm*—McDermott Will & Emery LLP

(57) ABSTRACT

A multilayer chip capacitor includes a capacitor body having dielectric layers, and internal electrode layers separated from each other in the capacitor body by the dielectric layers. Each internal electrode layer has one or two leads and includes at least one coplanar electrode plate. External electrodes are electrically connected to the internal electrode layers via the leads. The internal electrode layers constitute a plurality of blocks stacked repeatedly. Each block includes a plurality of the internal electrode layers stacked successively. The leads extending to a face of the capacitor body are arranged in a zigzag shape along a stacking direction. The leads of vertically adjacent ones of the electrode plates having opposite polarities are arranged to be horizontally adjacent to each other.

40 Claims, 26 Drawing Sheets (a)

(b)

(a)

(b)

MULTILAYER CHIP CAPACITOR

CLAIM OF PRIORITY

This application claims the benefit of Korean Patent Application Nos. 2005-110394 filed on Nov. 17, 2005 and 2006-99092 filed on Oct. 11, 2006, in the Korean Intellectual Property Office, the disclosure of which is incorporated herein by reference.

BACKGROUND OF THE INVENTION

1. Field of the Invention

The present invention relates to a multilayer chip capacitor, in particular, which can maintain Equivalent Series Resistance (ESR) in a suitable level with reduced Equivalent Series Inductance (ESL).

2. Description of the Related Art

Multilayer chip capacitors have widespread use as capacitive parts for Radio Frequency (RF) circuits. Specifically, they can be used availably as decoupling capacitors arranged in a power circuit of a Large Scale Integration (LSI) chip or device. To stabilize the power circuit, it is necessary that the multilayer chip capacitors have a lower ESL. Such demand is increasing further according to high frequency and low voltage trend of electronic devices. The stability of a power circuit depends on not only the ESL of a multilayer chip capacitor but also the ESR. When the ESR is too small, the stability of the power circuit is weakened and thus the voltage fluctuates abruptly in oscillation. Therefore, it is preferable to maintain the ESR in a suitable value.

As an approach proposed to reduce the ESL, U.S. Pat. No. 5,880,925 discloses a lead structure of first and second internal electrodes located in an "interdigitated" arrangement. FIG. 1a is an exploded perspective view illustrating the internal electrode structure of the conventional multilayer chip capacitor, and FIG. 1b is a perspective view illustrating the exterior of the multilayer chip capacitor shown in FIG. 1b.

Referring to FIG. 1a, internal electrodes 14 are formed on dielectric plates 11a and 11b, respectively. Dielectric layers 11a and 11b are stacked alternately one on another, thereby forming a capacitor body 20. The internal electrodes 14 include first internal electrodes 12 and second internal electrodes 13 of opposite polarities. A single one of the internal electrodes 12 cooperates with a single one of the internal electrodes 13 to constitute one block, and a plurality of such blocks are stacked one atop another. The first and second internal electrodes 12 and 13 are connected to external electrodes 30 (including 31 and 32), in which the first internal electrodes 12 are connected via leads 16 to the external electrodes 31, respectively, and the second internal electrodes 13 are connected via leads 17 to the external electrodes 32, respectively (see FIG. 2b). The leads 16 of the first internal electrodes 12 are located adjacent to and interdigitated with the leads 17 of the second internal electrodes 13. Since the leads adjacent to each other are supplied with voltages of opposite polarities, magnetic fluxes generated by high frequency currents applied from the external electrodes are canceled with each other between the adjacent leads and thus the ESL is reduced.

In addition, each internal electrode 12 or 13 has four leads 16 or 17. Since resistances created in the four leads are connected in parallel, the entire resistance of the capacitor is also lowered significantly. As a result, the ESR of the capacitor becomes too small. Then, it is difficult to satisfy target impedance and makes a power circuit unstable.

To prevent the ESR from becoming too low, U.S. Pat. No. 6,441,459 proposes the use of a single lead in one internal electrode. However, according to this patent document, currents flow in the same direction through some of internal electrodes which are adjacent to each other in a vertical direction (i.e., in a stacking direction). Then, magnetic fluxes are not canceled between the corresponding internal electrodes which are adjacent to each other in the vertical direction. This as a result increases the ESL.

SUMMARY OF THE INVENTION

The present invention has been made to solve the foregoing problems of the prior art and it is an object of the present invention to provide a multilayer chip capacitor capable of maintaining ESR in a suitable level with reduced ESL.

According to an aspect of the invention, the invention provides a multilayer chip capacitor. The multilayer chip capacitor includes a capacitor body having a plurality of dielectric layers stacked one atop another; a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads. The internal electrode layers constitute a plurality of blocks stacked repeatedly one atop another, in which each of the blocks includes a plurality of the internal electrode layers which are arranged successively in a stacking direction. Each of the electrode plates has one lead extending to a face of the capacitor body. The leads extending to the face of the capacitor body are arranged in a zigzag shape along the stacking direction. The leads of vertically adjacent ones of the electrode plates having opposite polarities are arranged to be horizontally adjacent to each other.

According to embodiments of the invention, the external electrodes may be at least six.

According to an embodiment of the invention, the total number of the external electrodes may be eight. In this case, each of the blocks includes six of the internal electrode layers which are arranged successively in the stacking direction.

In the capacitor having the eight external electrodes, first to fourth external electrodes may be arranged in sequence on a face of the capacitor body. In addition, first to sixth ones of the electrode plates may be stacked sequentially one atop another in each block, each of the first to sixth electrode plates having one lead extending to the face of the capacitor body. The leads of the first to fourth electrode plates may be connected to the first to fourth external electrodes, respectively. In addition, the lead of the fifth electrode plate may be connected to the third external electrode, and the lead of the sixth electrode plate is connected to the second external electrode. With this lead arrangement, the leads extending to one face of the capacitor body are arranged in a zigzag shape along a stacking direction.

According to another embodiment of the invention, the total number of the external electrodes may be ten. Here, each of the blocks includes eight of the internal electrode layers which are arranged successively in the stacking direction.

In the capacitor having the ten external electrodes, first to fifth external electrodes may be arranged in sequence on a face of the capacitor body. First to eighth ones of the electrode plates are stacked sequentially one atop another in each block, each of the first to eighth electrode plates having one lead extending to the face of the capacitor body. The leads of the first to fifth electrode plates may be connected to the first to fifth external electrodes, respectively. In addition, the lead of the sixth electrode plate is connected to the fourth external electrode, the lead of the seventh electrode plate is connected to the third external electrode, and the lead of the eighth electrode plate is connected to the second external electrode. With this lead arrangement, the leads extending to one face of the capacitor body are arranged in a zigzag shape along a stacking direction.

According to an embodiment of the invention, vertically adjacent ones of the leads which are connected to a common external electrode, may be extended in different directions with a predetermined angle therebetween. Preferably, the angle ranges from 45° to 135°.

According to an embodiment of the invention, each of the internal electrode layers may be divided into coplanar electrode plates by a separator slit, with each of the electrode plates having a lead for electrically connecting the electrode plate to a corresponding one of the external electrodes. Each of the electrode plates may have one (a single) lead.

Each of the internal electrode layers may be divided into a pair of the coplanar electrode plates by the separator slit. The coplanar electrode plate pair may have opposite polarities. Alternatively, the two coplanar electrode plates may have the same polarity.

According to an embodiment of the invention, the separator slit may be extended in parallel with the longitudinal direction of the capacitor body.

According to another embodiment of the invention, the separator slit may be extended in a diagonal direction of the capacitor body. Here, the separator slits of the vertically adjacent internal electrode layers may be extended in different diagonal directions.

According to another embodiment of the invention, the separator slits of the vertically adjacent internal electrode layers may be arranged to extend perpendicularly to each other. For example, the separator slits may include longitudinal separator slits extending along the longitudinal direction of the capacitor body and transverse separator slits extending perpendicularly to the longitudinal direction of the capacitor body, in which the longitudinal and traverse separator slits alternate with each other along the stacking direction.

The coplanar electrode plates may have the same area. Alternatively, the coplanar electrode plates may have different areas. In this case, the separator slits of the vertically adjacent internal electrode layers may have different in-plane positions. Alternatively, the separator slits of the vertically adjacent internal electrode layers have the same in-plane position.

According to an embodiment of the invention, each of the electrode plates may have a non-separator slit extended from a side of the electrode plate toward the center to change a current flow inside the electrode plate. The separator slits and the non-separator slits may be extended in parallel with the longitudinal direction of the capacitor body. Preferably, corresponding ones of the non-separator slits in the vertically adjacent electrode plates have the same in-plane position. Such an arrangement of the non-separator slits having the same in-plane position can reduce capacitance loss that otherwise may be caused by the non-separator slits. A pair of the coplanar electrode plates may allow currents to flow through adjacent regions thereof in opposite directions. The vertically adjacent electrode plates may allow current to flow therethrough in opposite directions.

According to an embodiment of the invention, at least one of the internal electrode layers in the each block may be divided into coplanar electrode plates by a separator slit, and each of the electrode plates may have a lead for electrically connecting the electrode plate to a corresponding one of the external electrodes.

Each electrode plate of the divided internal electrode layer may have one lead for electrically connecting to the external electrode. Here, the separator slit may be extended along the longitudinal direction of the capacitor body.

In the multilayer chip capacitor, the total number of the external electrodes may be eight. In this case, each of the blocks may include six of the internal electrode layers arranged successively in the stacking direction, and three of the six internal electrode layers each may be divided into a pair of the coplanar electrode plates.

In the multilayer chip capacitor, each of the blocks may include first to sixth ones of the internal electrode layers stacked sequentially. Each of the first, third and fifth internal electrode layers may divided into a pair of the electrode plates, and each electrode plates of the divided internal electrode layers may have one lead. In addition, each of the second, fourth and sixth internal electrode layers may be of a single undivided structure having two leads.

According to an embodiment of the invention, each of the internal electrode layers may comprise only one undivided electrode plate, each of the electrode plates may have a lead electrically connecting to the external electrode.

In this case, each of the electrode plates may have two leads extending to opposite faces of the capacitor body, and the leads extending to each of the opposite faces may be arranged, on the respective face, in a zigzag shape along a stacking direction.

In the multilayer chip capacitor, the total number of the external electrodes may be eight. In this case, each of the blocks may include first to sixth ones of the internal electrode layers stacked sequentially.

In the multilayer chip capacitor, first to fourth ones of the external electrodes may be arranged sequentially on a face of the capacitor body. The first to sixth internal electrode layers may have first to sixth leads extending to the face of the capacitor body, respectively. In addition, the first to fourth leads may be connected to the first to fourth external electrodes, respectively, and the fifth lead may be connected to the third external electrode, and the sixth lead may be connected to the second external electrode.

In the multilayer chip capacitor, the total number of the external electrodes may be ten. In this case, each of the blocks may include-first to eighth ones of the internal electrode layers stacked sequentially.

In the multilayer chip capacitor, first to fifth ones of the external electrodes may be arranged sequentially on a face of the capacitor body. The first to eighth internal electrode layers may have first to eighth leads extending to the face of the capacitor body, respectively. The first to fifth leads may be connected to the first to fifth external electrodes, respectively. In addition, the sixth lead may be connected to the fourth external electrode, the seventh lead may be connected to the third external electrode, and the eighth lead may be connected to the second external electrode.

According to another aspect of the invention, the invention provides a multilayer chip capacitor. The multilayer chip capacitor includes a capacitor body of a plurality of dielectric layers stacked one atop another; a plurality of internal electrode layers separated from each other in the capacitor body by the dielectric layers, wherein each of the internal electrode layers has one or two leads extending toward an outer surface of the capacitor body, and includes at least one coplanar electrode plate; and a plurality of external electrodes arranged on the outer surface of the capacitor body and electrically connected to the internal electrode layers via the leads. The internal electrode layers constitute blocks stacked repeatedly one atop another, each of the blocks including a plurality of the internal electrode layers which are arranged successively in a stacking direction. In addition, the leads of vertically adjacent ones of the electrode plates having opposite polarities are arranged to be horizontally adjacent to each other.

According to an embodiment of the invention, the total number of the external electrodes may be eight. Here, each of the blocks may include first to eighth ones of the internal electrode layers stacked sequentially. Each of the fourth and eighth internal electrode layers may have a pair of leads extending to opposite faces of the capacitor body. In addition, each of the first to third and fifth to seventh internal electrode layers may have one lead.

In the multiplayer chip capacitor having eight external electrodes, the fourth internal electrode layer may have a first lead extending to first one of the opposite faces of the capacitor body and a second lead extending to second one of the opposite faces of the capacitor body, and the eight internal electrode layer may have a third lead extending to the first face and a fourth lead extending to the second face. The first lead may be arranged horizontally adjacent to the lead of the third internal electrode layer, and the second lead may be arranged horizontally adjacent to the lead of the fifth internal electrode layer. In addition, the third lead may be arranged horizontally adjacent to the lead of the first internal electrode layer of an adjacent block, and the fourth lead may be arranged horizontally adjacent to the lead of the seventh internal electrode layer.

According to an embodiment of the invention, the fourth internal electrode layer may include first and second electrode plates divided by a separator slit, the first electrode plate having the first lead, the second electrode plate having the second lead. The eighth internal electrode layer may include third and fourth electrode plates divided by a separator slit, the third electrode plate having the third lead, the fourth electrode plate having the fourth lead. In addition, each of the first to third and fifth to seventh internal electrode layers may be an undivided unitary structure and may have one lead.

According to another embodiment of the invention, each of the internal electrode layers may comprise one (a single) undivided electrode plate, and each of the undivided electrode plate may have a lead for electrically connecting to a corresponding one of the external electrodes.

According to embodiments of the invention, each internal electrode layer has only one or two leads. This can prevent the ESR from being excessively reduced. Furthermore, the leads of the electrode plates vertically adjacent to each other having opposite polarities are arranged to be horizontally adjacent to each other always, throughout the entire internal structure of the capacitor, thereby suppressing an increase in the ESL.

Herein, the term "separator slit" indicates a slit area that physically divides an internal electrode layer, and the term "non-separator slit" indicates a slit area that does not physically divide an internal electrode layer.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a perspective view illustrating an exterior of the multilayer chip capacitor shown in FIG. 1a;

DETAILED DESCRIPTION OF THE PREFERRED EMBODIMENT

Figure 1A:
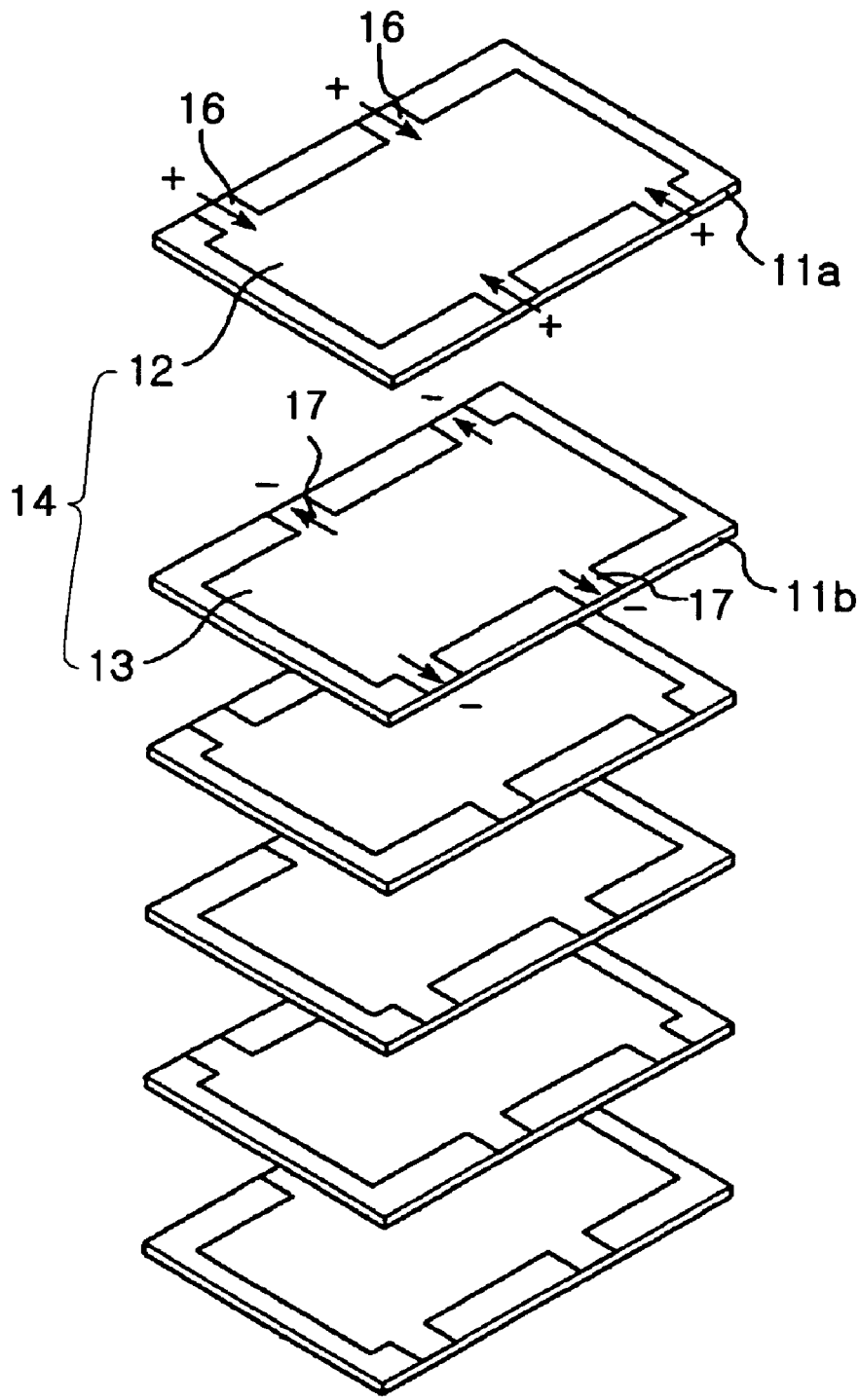
FIG. 1a is an exploded perspective view illustrating an internal electrode structure of a conventional multilayer chip capacitor.

The present invention will now be described more fully hereinafter with reference to the accompanying drawings, in which preferred embodiments of the invention are shown. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness, shapes and dimensions may be exaggerated for clarity and the same reference numerals are used to designate the like components throughout.

FIGS. 2 to 17 illustrate internal electrode structures of multilayer chip capacitors according to several embodiments of the invention. The internal electrode structures shown in FIGS. 2 to 17 are applicable to an eight (8) terminal capacitor 100 (having eight external electrodes) as shown in FIG. 18.

Figure 17:
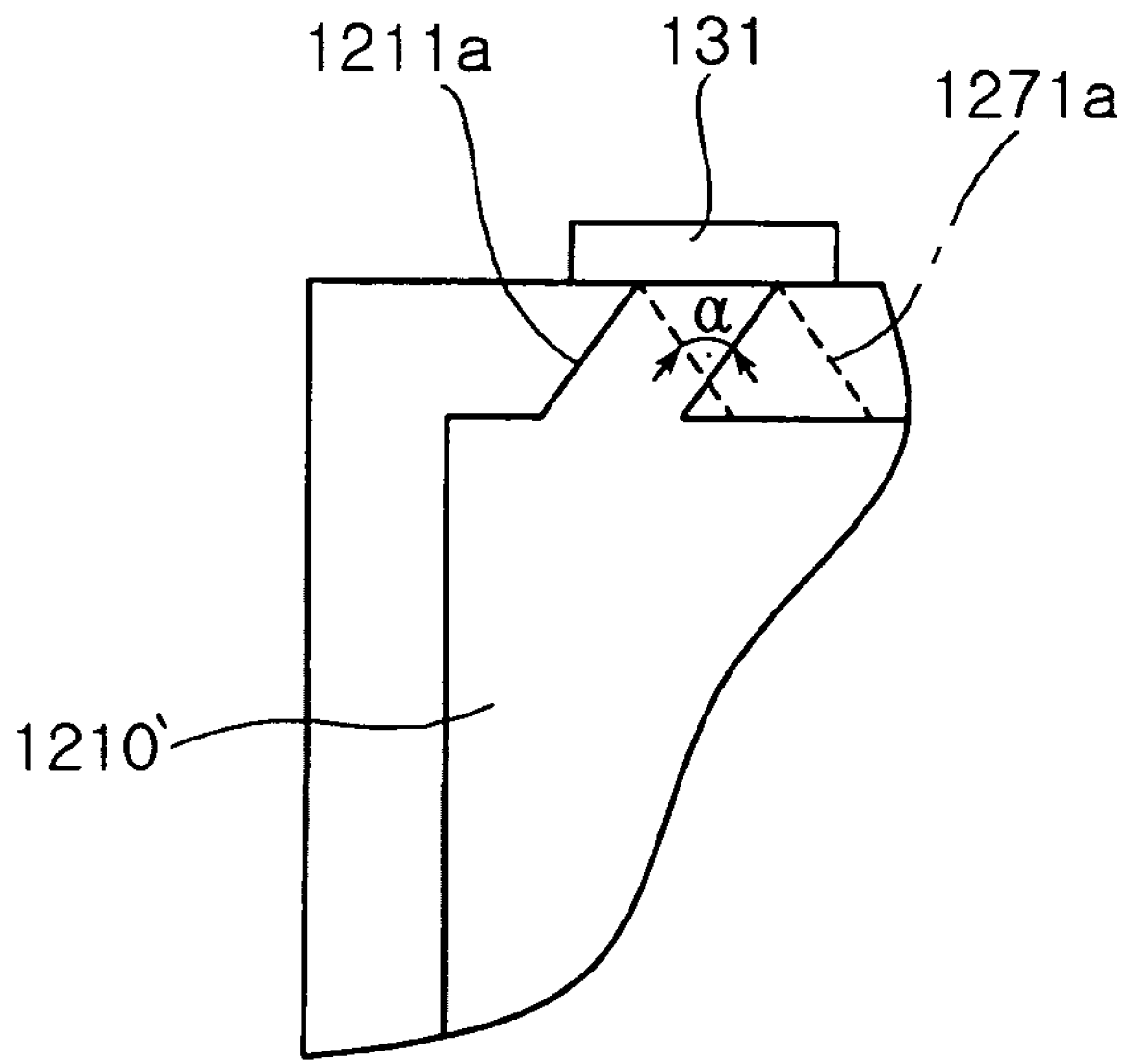
FIG. 17 is an enlarged fragmentary plan view illustrating a part of the internal electrode structure shown in FIG. 16.
Figure 18:
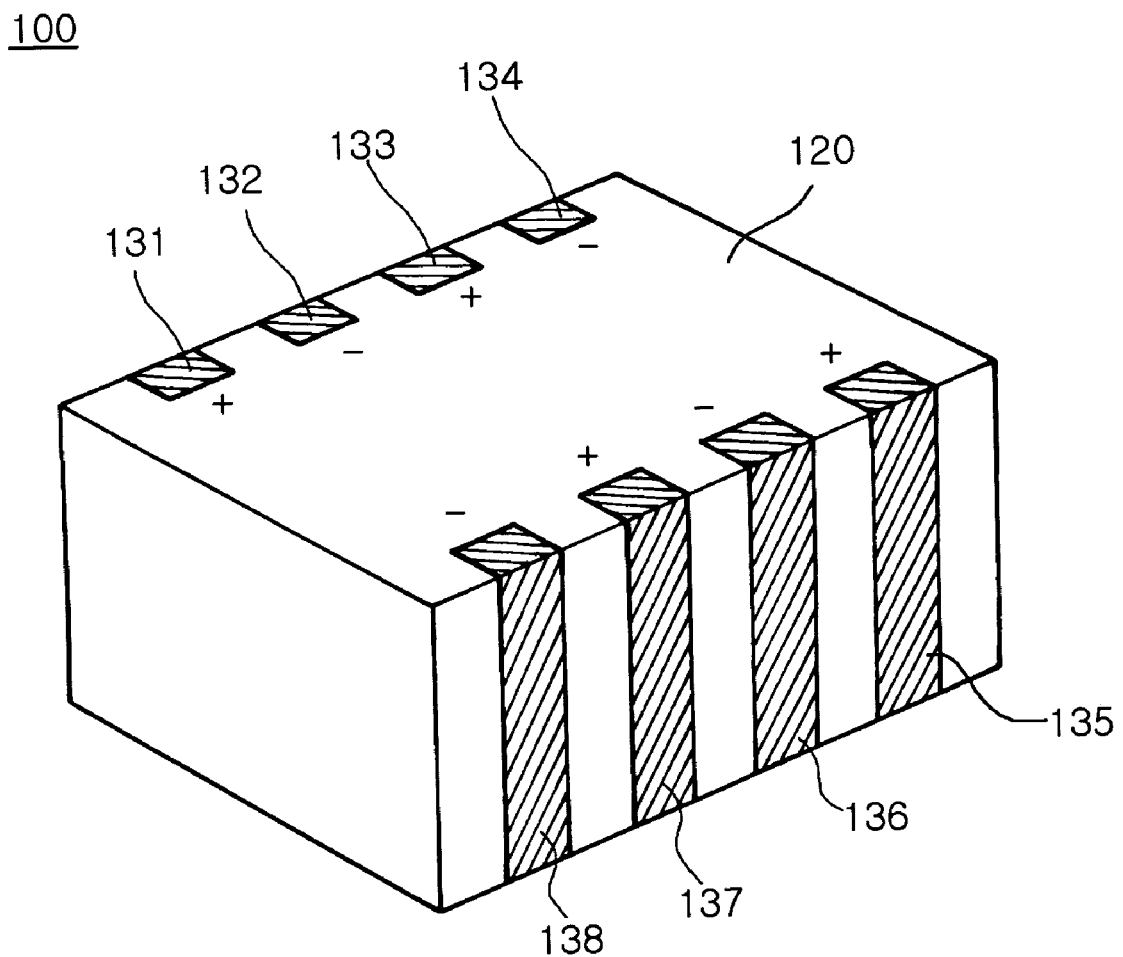
FIG. 18 is a perspective view illustrating an exterior of an eight-terminal multilayer chip capacitor according to an embodiment of the invention.

Referring to FIG. 18, the capacitor 100 includes a capacitor body 120 and eight external electrodes 131 to 138 formed on the exterior (that is, the outer surface) of the capacitor body 120. The capacitor body 120 is formed by stacking a plurality of dielectric layers one atop another. A plurality of internal electrode layers are arranged in this body 120, and separated from one another by the dielectric layers. The external electrodes 131 to 138 of opposite polarities are arranged on opposing side faces of the body 120 in such a fashion that electrodes of one polarity alternate with those of the opposite polarity. Examples of the internal structure of the 8-terminal capacitor 100 are illustrated in FIGS. 2 to 17.

Figure 2:
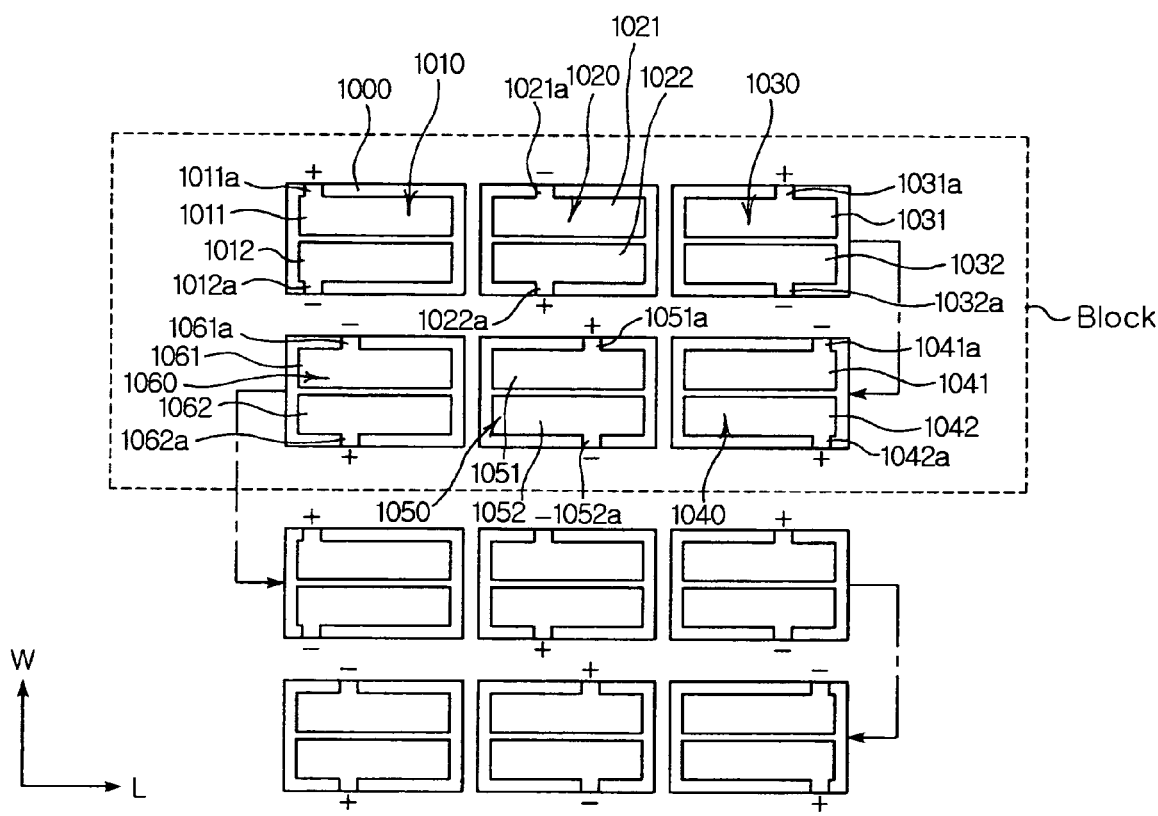
FIG. 2 is a plan view illustrating an internal electrode structure of a multilayer chip capacitor according to a preferred embodiment of the invention.

Referring to FIG. 2, six (6) internal electrode layers 1010, 1020, 1030, 1040, 1050 and 1060 formed respectively on dielectric layers 1000 are stacked one atop another to constitute a block. That is, the six internal electrode layers 1010 to 1060 are arranged successively in the stacking direction (see the arrow followed by a dashed dot line) to constitute a single unit (block) of a periodic multilayer structure. A plurality of such blocks are stacked repeatedly to produce a capacitor body (see the reference numeral 120 in FIG. 18). Herein, the phrase "stacked repeatedly" indicates that the respective blocks have the same internal electrode structure. While the six successive internal electrode layers 1020, 1020, 1030, 1040, 1050 and 1060 starting from the internal electrode layer 1010 are shown forming one block (dotted line) in FIG. 2, the starting point of the block is not limited thereto. For example, six successive electrode layers 1020, 1030, 1040, 1050, 1060 and 1010 starting from the internal electrode layer 1020 can be set as one block. Irrespective of an internal electrode layer set as a starting point, one block is composed of six (6) successive internal electrode layers, which are adjacent to each other via the dielectric layers.

Here, the internal electrode layer 1010 is divided into a pair of electrode plates or electrode plate pair 1011 and 1012 by a separator slit. In the same fashion, the other internal electrode layers 1020, 1030, 1040, 1050 and 1060 are also divided into pairs of electrode plates 1021 and 1022; 1031 and 1032; 1041 and 1040; 1051 and 1052; 1061 and 1062, respectively. As shown in the drawings, the pair of electrode plates 1011 and 1012 on the same plane have opposite polarities. This is the same to the other pairs of electrode plates 1021 and 1022 to 1061 and 1062. The separator slit is extended across a central portion of a corresponding internal electrode layer to be parallel with the longitudinal direction L of the capacitor body (i.e., perpendicular to the width direction W thereof) so that a pair of coplanar electrode plates have substantially the same areas. For example, the internal electrode layer 1010 is divided into the electrode plates 1011 and 1012 of the same area by the separator slit which is arranged in parallel with the longitudinal direction L of the capacitor body. Then, opposing electrode plates of opposite polarities (e.g., the electrode plates 1011 and 1021 arranged adjacent to each other in a vertical or stacking direction) constitute one capacitive element. (Hereinafter those electrode plates or layers adjacent to each other in a vertical direction will also be referred to as "vertically adjacent plates or layer.")

As shown in FIG. 2, the electrode plate 1011 has one lead 1011a and the electrode plate 1012 has one lead 1012a. In the same fashion, each of the electrode plates 1021, 1022, 1031, 1032, 1041, 1042, 1051, 1052, 1061 and 1062 has one lead 1021a, 1022a, 1031a, 1032a, 1041a, 1042a, 1051a, 1052a, 1061a and 1062a, respectively. These leads 1011a to 1062a provide a connection to external electrodes (see reference numerals 131 to 138 in FIG. 18) to electrically connect the internal electrode layers 1010 to 1060 to the external electrodes 131 to 138.

Since each internal electrode layer is divided into a pair of electrode plates and each electrode plate has one (i.e., a single) lead as set forth above, it is possible to effectively prevent capacitor ESR from excessively dropping. That is, dividing the internal electrode layer into the electrode plates relatively decreases the area of current paths, which in turn increases resistant against current flowing through the internal electrode layer. Furthermore, since the individual electrode plate has one lead, it is possible to prevent a sharp decrease in resistance which results from several leads connected in parallel. As a result, the capacitor can maintain ESR in a suitable level while preventing any instability of a power circuit owing to excessively low ESR.

In addition, in the electrode plates (e.g., 1011 and 1021) having opposite polarities adjacent to each other in the vertical direction (i.e., the stacking direction), the leads (e.g., 1011a and 1021a) are arranged to be always adjacent to each other in a horizontal direction, throughout the entire internal structure of the capacitor. (The term "adjacent to each other in a horizontal direction" will also be referred to as "horizontally adjacent" hereinafter.) That is, the leads of the vertically adjacent electrode plates having opposite polarities are always connected to the external electrodes adjacent to each other. For example, the lead 1011a and the lead 1021a are arranged to be connected, respectively, to the adjacent external electrodes 131 and 132 of opposite polarities.

As the leads of opposite polarities are adjacent to each other in horizontal and vertical directions, currents of different directions (in particular, opposite directions) flow through the adjacent leads. Then, magnetic fluxes are canceled out with each other, thereby lowering parasitic inductance and further lowering ESL of the capacitor. This as a result can further improve the stability of the power circuit with more reduced ESL while maintaining ESR in a suitable level.

Figure 3:
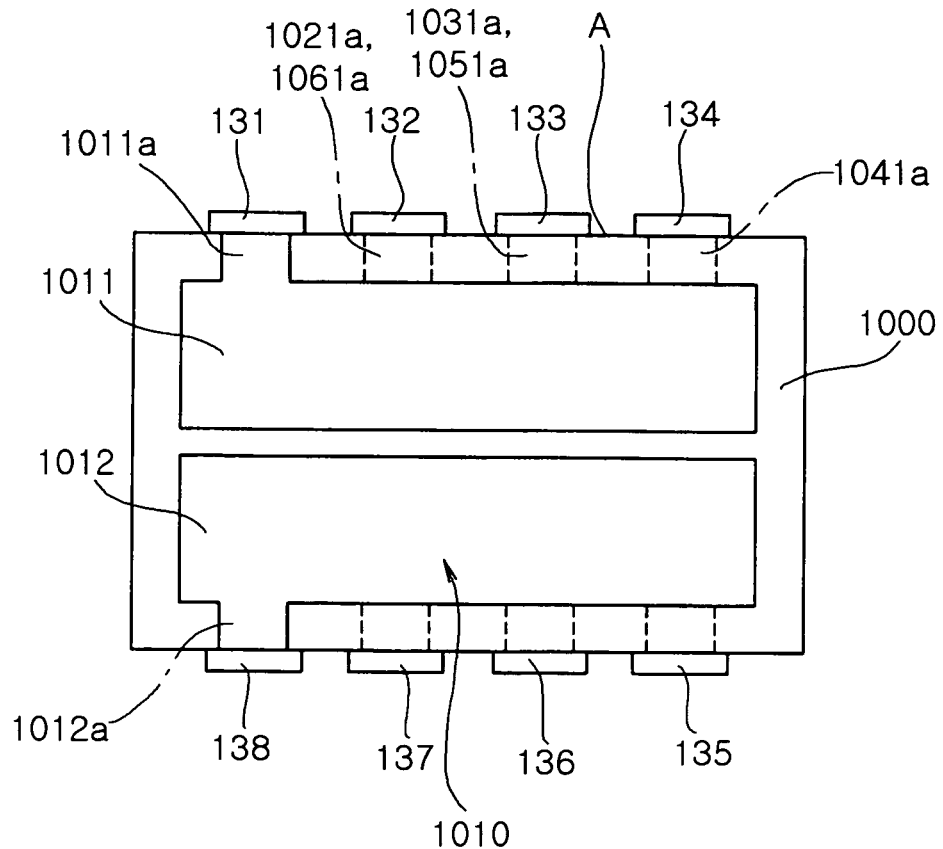
FIG. 3 is a plan view (a) and a side elevation view (b) illustrating an arrangement of the leads shown in FIG. 2.
Figure 3:
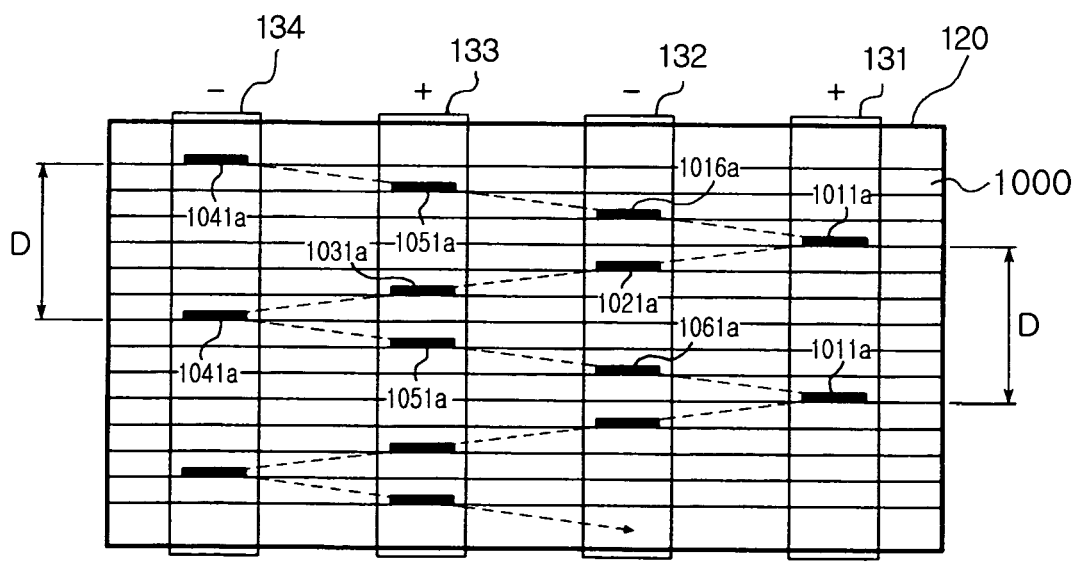

FIG. 3 is a plan view (a) and a side elevation view (b) illustrating an arrangement of the leads shown in FIG. 2. The side elevation view of FIG. 3(b) corresponds to a side elevation view of a side face A of FIG. 3(a). Referring to FIG. 3, it is apparent that the leads 1011a, 1021a, 1031a, 1041a, 1051a, 1061a are arranged on the side face A of the capacitor body in a zigzag or serpentine shape along the stacking direction. (See the dotted line of FIG. 3(b) in particular.)

Describing in more detail, first to fourth external electrodes 131 to 134 are arranged sequentially on the side face A of the capacitor body (from left to right in FIG. 3(a)). In one block, first to sixth electrode plates 1011, 1021, 1031, 1041, 1051 and 1061 are stacked sequentially one atop another, each of which has one lead 1011a, 1021a, 1031a, 1041a, 1051a and 1061a extended to the side face A (see FIG. 2). As shown in FIG. 3, the lead 1011a of the first electrode plate 1011 is connected to the first external electrode 131. In the same fashion, the leads 1021a, 1031a, 1041a of the second to fourth electrode plates 1021, 1031 and 1041 are connected to the second to fourth external electrodes 132, 133 and 134, respectively. In addition, the lead 1051a of the fifth electrode plate 1051 is connected to the third external electrode 133, and the lead 1061a of the sixth electrode plate 1061 is connected to the second external electrode 132. As this lead arrangement is repeated in blocks, the leads extending to the side surface of the capacitor body are arranged in a zigzag shape. It should be understood that those leads extending to the side face opposed to the side face A are also arranged in a zigzag shape (see FIG. 2).

The zigzag arrangement of the leads 1011a to 1061a as mentioned above provides a merit of reducing "mutual inductance between those leads of the same polarity which are vertically adjacent." As shown in FIG. 3(b), the mean distance between two vertically adjacent leads which are connected to a common external electrode (that is, the mean interval between the leads connected a common external electrode) is larger than the thickness of two dielectric layers. For example, the distance between the vertically adjacent leads 1011*a* connected to the external electrode 131 corresponds substantially to the total thickness D of six dielectric layers. A larger distance between the vertically adjacent leads of the same polarity may easily reduce or suppress strong mutual inductance between the leads, which may otherwise result from their magnetic coupling. This thereby further reduces the ESL of the capacitor.

Figure 4:
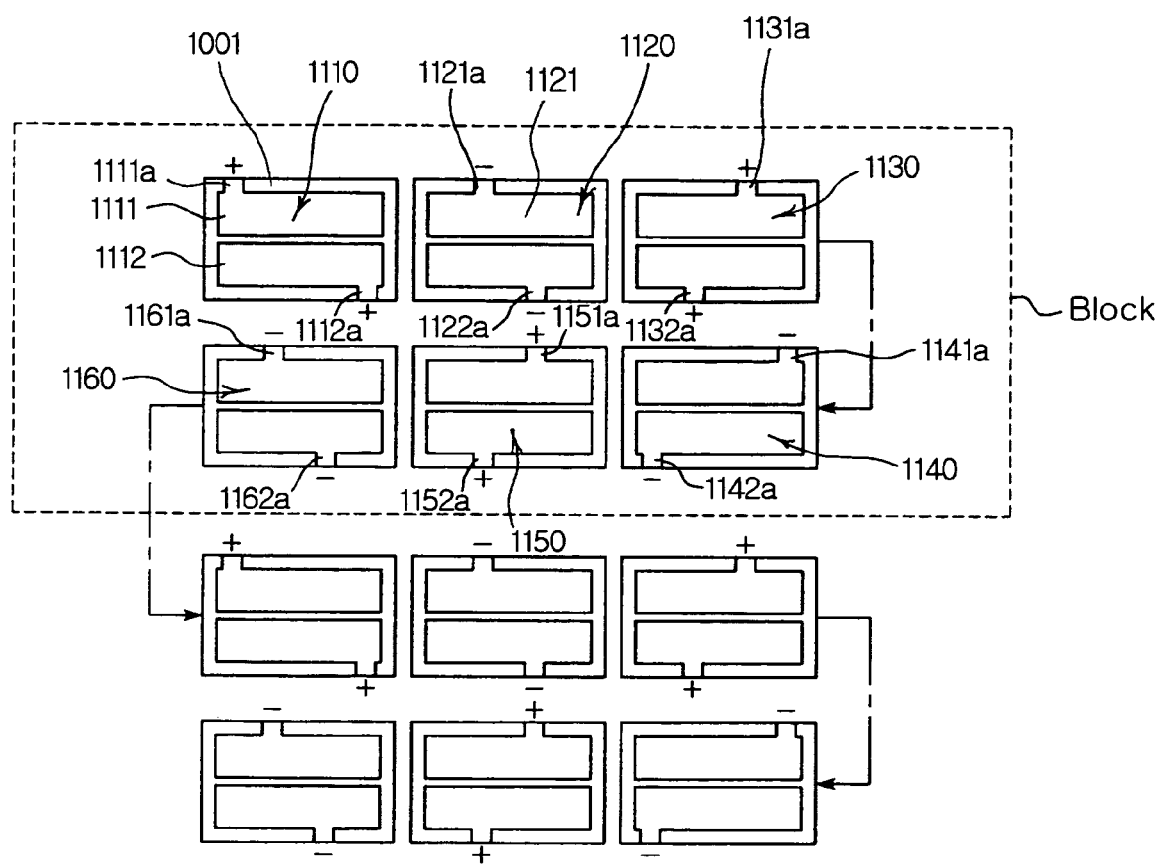
FIG. 4 is a plan view illustrating an internal electrode structure of a multilayer chip capacitor according to another embodiment of the invention.

FIG. 4 is a plan view illustrating an internal electrode structure of a multilayer chip capacitor according to another embodiment of the invention. This embodiment shown in FIG. 4 is distinguished from that shown in FIG. 2 in that a pair of coplanar electrode plates have the same polarity.

Referring to FIG. 4, six internal electrode layers 1110 to 1160 formed on dielectric layers 1001 are stacked successively one atop another to constitute a block. A plurality of such blocks are stacked repeatedly one atop another to produce a capacitor body (see the reference numeral 120 in FIG. 18).

The internal electrode layer 1110 formed on the dielectric layer 1001 is divided into a pair of coplanar electrode plates or a coplanar electrode plate pair 1111 and 1112 by a separator slit. In the same fashion, each of the internal electrode layers 1120, 1130, 1140, 1150 and 1160 is also divided into a pair of coplanar electrode plates by a separator slit. Opposing electrode plates (e.g., 1111 and 1121) of opposite polarities constitute one capacitive element. Each of the electrode plates has one lead (see the reference numerals 1111*a* to 1162*a*). The leads 1111*a* to 1162*a* provide a connection to the external electrodes (see the reference numerals 131 to 138 in FIG. 18) to electrically connect the internal electrode layers 1110 to 1160 to the external electrodes 131 to 138. In this embodiment also, the leads (e.g., 1111*a*, 1121*a*, 1131*a*, 1141*a*, 1151*a* and 1161*a*) extended to one side face of the capacitor body are arranged in a zigzag shape. (See FIG. 5(*a*).)

Figure 1B:
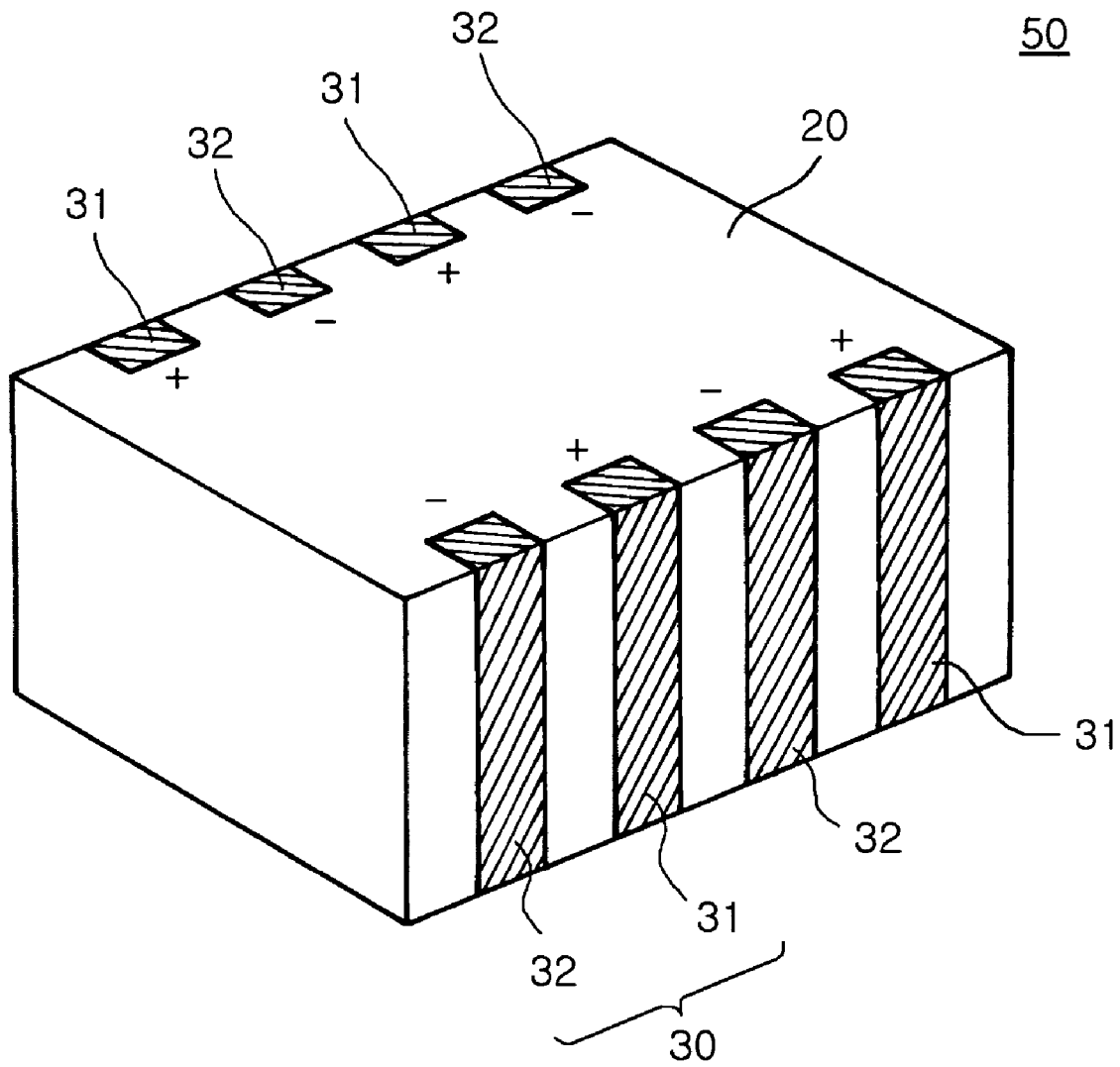
Figure 5:
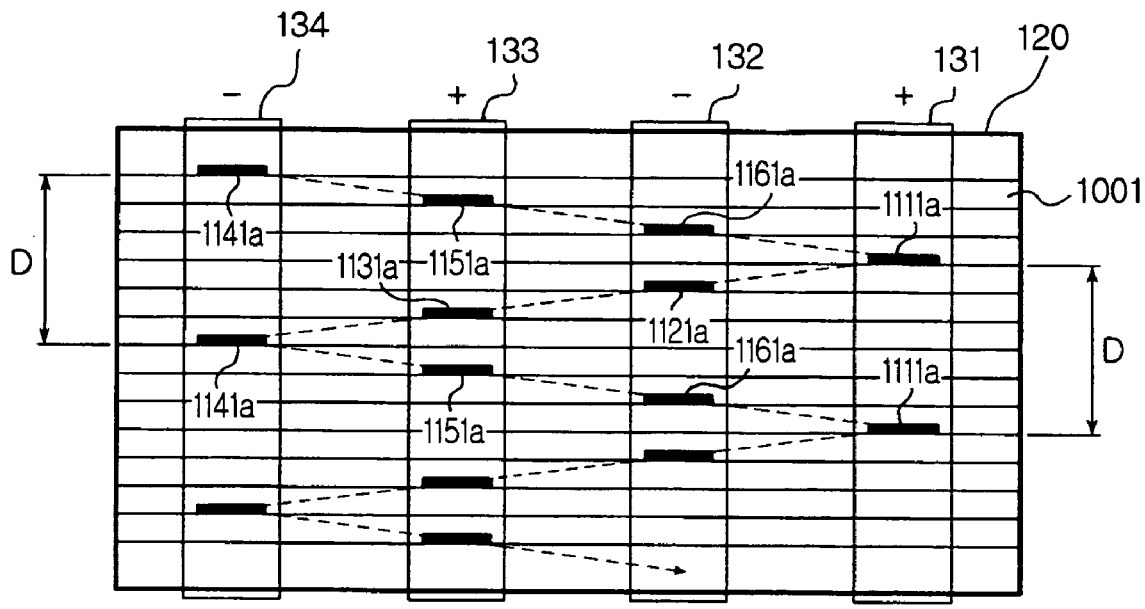
FIG. 5 is a plan view illustrating arrangements of leads, in which (a) shows an arrangement of the leads extending to a side face of a body of the multilayer chip capacitor shown in FIG. 4, and (b) shows an arrangement of the leads extending to a side face of a body of a multiplayer chip capacitor of the prior art.
Figure 5:
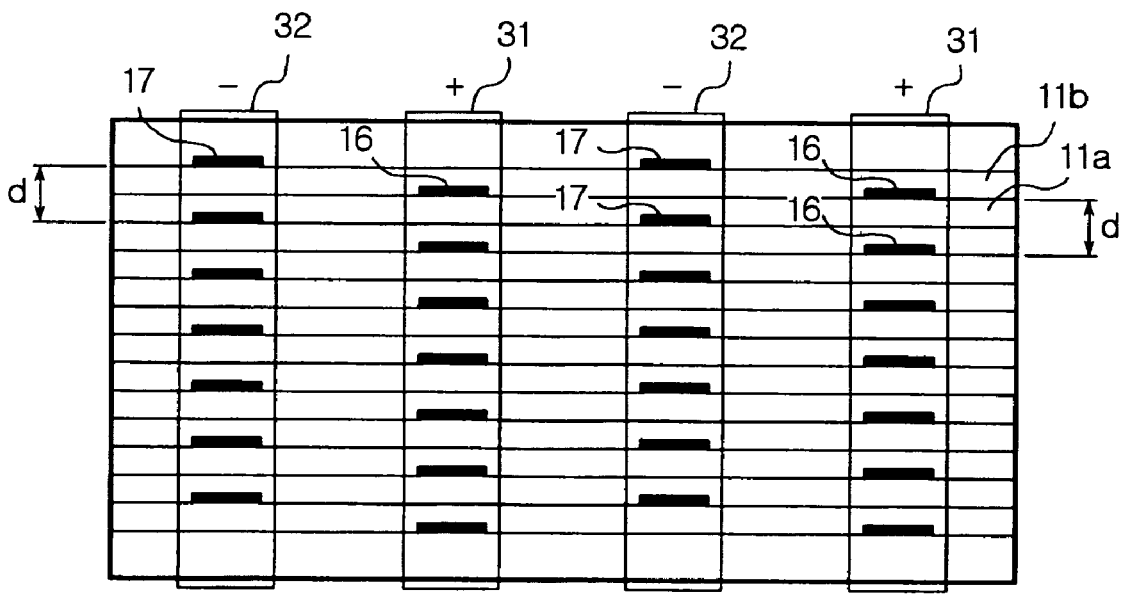

FIG. 5(*a*) illustrates an arrangement of leads extending to a side face of a body of the capacitor shown in FIG. 4, while FIG. 5(*b*) illustrates an arrangement of leads extending to a side face of a body of a multiplayer chip capacitor of the prior art as shown in FIGS. 1*a* and 1*b*.

Referring to FIGS. 4 and 5(*a*), first to fourth external electrodes 131 to 134 are arranged sequentially on one face of the body. First to sixth internal electrode layers 1110, 1120, 1130, 1140, 1150 and 1160 have first to sixth leads 1111*a*, 1121*a*, 1141*a*, 1151*a* and 1161*a*, respectively, which are extended to the face of the body. (Each internal electrode layer has 'one' lead extended to the face of the capacitor body.) The first to fourth leads 1111*a*, 1121*a*, 1131*a* and 1141*a* are arranged to connect with the first to fourth external electrodes 131, 132, 133 and 134, respectively. In addition, the fifth lead 1151*a* is arranged to connect with the third external electrode 133, and the sixth lead 1161*a* is arranged to connect with the second external electrode 132. When such arrangements of leads are stacked repeatedly, the leads 1111*a* to 1161*a* extended to one face of the body are arranged in a zigzag shape along the stacking direction. (See the dotted line of FIG. 5(*a*).)

The "zigzag arrangement of the leads 1111*a* to 1161*a*" as mentioned above provides a merit of reducing "mutual inductance between those leads of the same polarity which are vertically adjacent." As shown in FIG. 5(*a*), the mean distance between two vertically adjacent leads which are connected to a common external electrode (that is, the mean interval between the leads connected a common external electrode), is larger than the thickness of two dielectric layers. For example, the distance between the vertically adjacent leads 1111*a* connected to the external electrode 131 corresponds substantially to the total thickness D of six dielectric layers. A larger distance between the vertically adjacent leads of the same polarity may easily reduce or suppress strong mutual inductance between the leads, which may otherwise result from their magnetic coupling. This thereby further reduces the ESL of the capacitor.

To the contrary, a conventional capacitor does not have the "zigzag arrangement of leads" as mentioned above. Accordingly, in the conventional capacitor (see FIGS. 1*a* and 1*b*), the mean distance between two vertically adjacent leads which are connected to a common electrode, is relatively small. For example, the distance between the vertically adjacent leads 16 which are connected in common to the external electrode 31, corresponds merely to the total thickness d of two dielectric layers. As a result, strong mutual inductance is created between the leads of the same polarity and thus ESL becomes relatively larger compared to this embodiment.

According to this embodiment, the individual internal electrode layer is divided into two electrode plates, each of which has one lead, so as to prevent 'excessively low ESR of the capacitor and resultant instability of a power circuit'.

In the vertically adjacent electrode plates of opposite polarities (e.g., 1111 and 1121), the leads (e.g., 1111*a* and 1121*a*) are arranged to be always horizontally adjacent. Then, currents of different directions (in particular, opposite directions) flow through the adjacent leads (e.g. 1111*a* and 1121*a*) and thus their magnetic fluxes are canceled with each other, reducing ESL. As a result, ESR of a suitable level and reduced ESL can improve the stability of the power circuit. Furthermore, the "zigzag arrangement of the leads" as mentioned above further enhances the ESL reducing effect.

Figure 6:
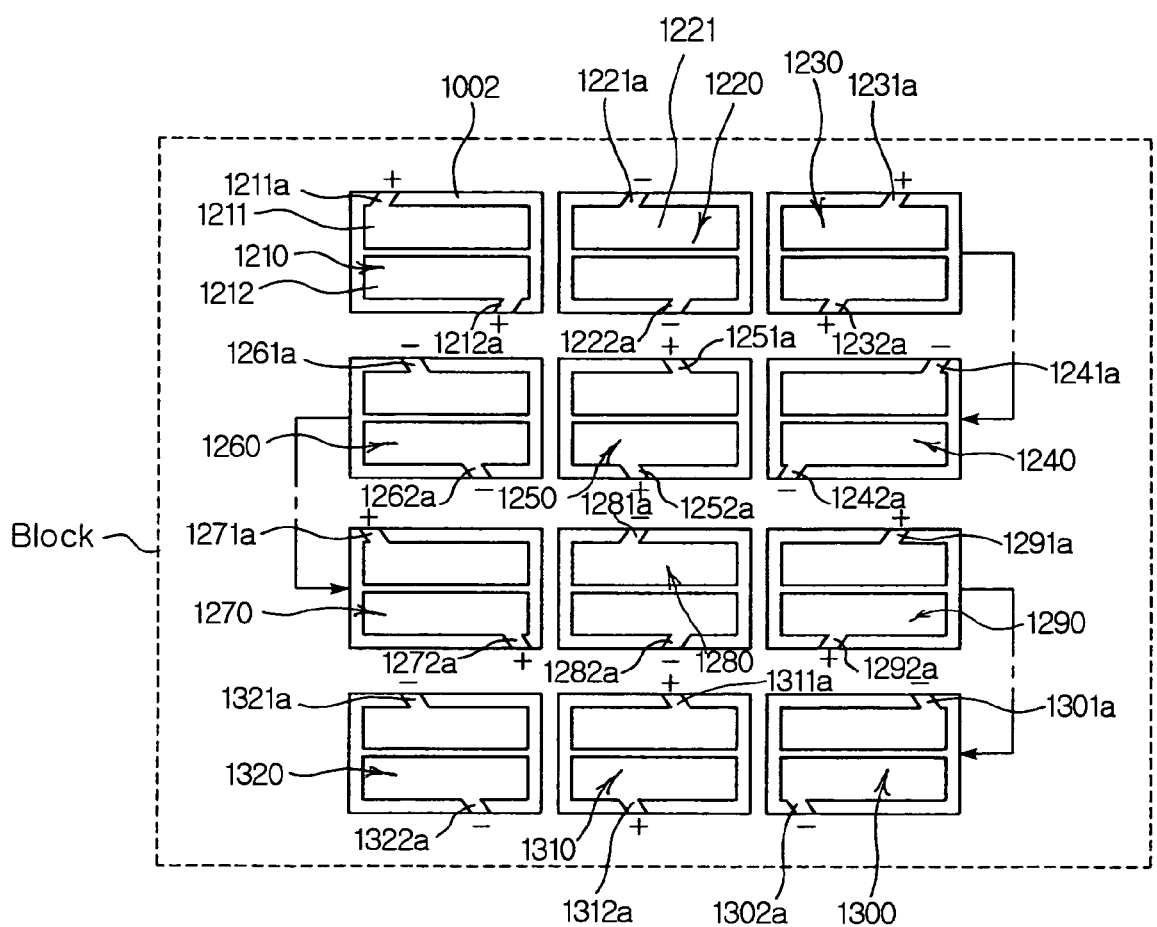
FIG. 6 is a plan view illustrating an internal electrode structure of a multilayer chip capacitor according to further another embodiment of the invention.

FIG. 6 is a plan view illustrating an internal electrode structure of a multilayer chip capacitor according to further another embodiment of the invention. In this embodiment as shown in FIG. 6, vertically adjacent ones 1211*a* and 1271*a* of the leads connected to the same external electrode 131 are extended in different directions with a predetermined angle therebetween. In the same fashion, vertically adjacent ones (e.g., 1221*a* and 1261*a*; 1231*a* and 1251*a*; 1232*a* and 1252*a*) of the leads connected to the common external electrode (e.g., 132; 133; 137) are extended in different directions. In this embodiment also, two coplanar electrode plates (e.g., 1211 and 1212) have the same polarity as in the above embodiment in FIG. 4.

Referring to FIG. 6, twelve (12) internal electrode layers 1210, 1220, 1230, 1240, 1250, 1260, 1270, 1280, 1290, 1300, 1310 and 1320 formed on dielectric layers 1002 are stacked successively one atop another to constitute a block. A plurality of such blocks are stacked repeatedly one atop another to produce a capacitor body (see the reference numeral 120 in FIG. 18).

An internal electrode layer 1210 formed on the dielectric layer 1002 is divided into a pair of coplanar electrode plates 1211 and 1212 by a separator slit. In the same fashion, each of other internal electrode layers 1220, 1230, 1240, 1250, 1260, 1270, 1280, 1290, 1300, 1310 and 1320 is divided into a pair of coplanar electrode plates by a separator slit. Opposing electrode plates such as 1211 and 1221 of opposite polarities constitute one capacitive element. Each of the electrode plates has one lead (see the reference numerals 1211*a* to 1322*a*). The leads 1211*a* to 1322*a* provide a connection to the external electrodes (see the reference numerals 131 to 138 in FIG. 18) to electrically connect the internal electrode layers 1210 to 1320 to the external electrodes 131 to 138.

Figure 7:
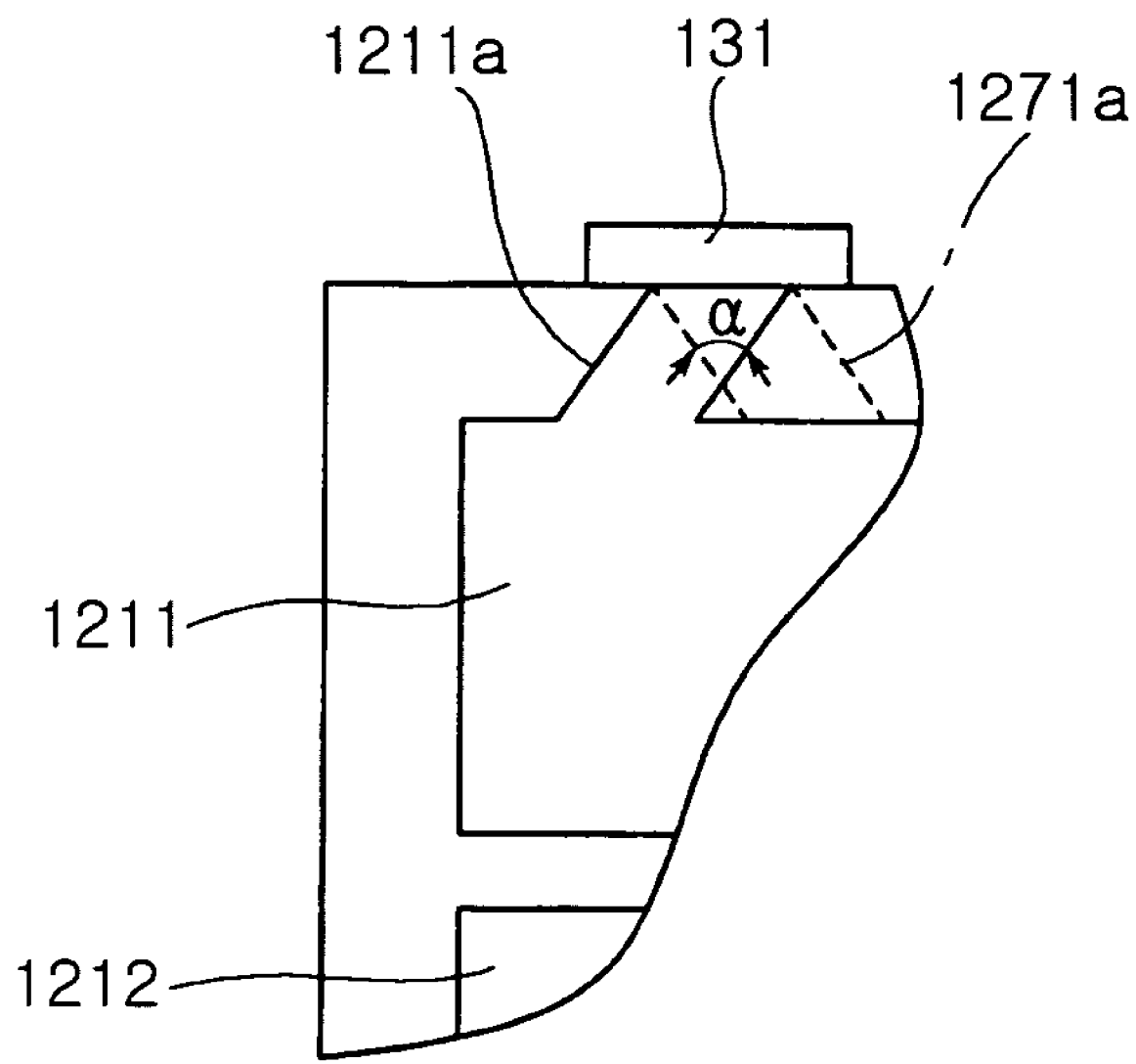
FIG. 7 is an enlarged fragmentary plan view illustrating a part of the internal electrode structure shown in FIG. 6.

Specifically, in this embodiment, the leads connected to the same external electrode such as the leads 1211*a* and 1271*a*;

1221a and 1261a; 1231a and 1251a; 1232a and 1252a are extended in different directions with a predetermined angle therebetween. This feature is clearly shown in an enlarged fragmentary view of FIG. 7. As shown in FIG. 7, the leads 1211a and 1271a commonly connected to the external electrode 131 are extended in different directions with a predetermined angle α therebetween. Preferably, the angle α between the leads connected to the same external electrode is in the range from 45° to 135°.

When the vertically adjacent ones (e.g., 1211a and 1271a) of the leads connected to the common external electrode are extended in different directions with a predetermined angle therebetween, currents flowing through the adjacent leads are directed differently. This brings about an effect of suppressing magnetic flux enhancement between the adjacent leads, and thus strong mutual inductance does not take place in the adjacent leads connected to the same external electrode. As a result, the ESL of the capacitor is further lowered.

According to this embodiment, as in the foregoing embodiments, the individual internal electrode layer is divided into two electrode plates, each of which has one lead, so as to prevent excessively low ESR of the capacitor and resultant instability of a power circuit.

Furthermore, the leads (e.g., 1211a and 1221a) of the vertically adjacent electrode plates (e.g., 1211 and 1221) of opposite polarities are arranged to be always horizontally adjacent. Then, currents of different directions flow through the adjacent leads (e.g., 1211a and 1221a), and thus their magnetic fluxes are canceled with each other. In addition, the leads extending to one face of the capacitor body are arranged in a zigzag shape. As a result, ESR of a suitable level and reduced ESL can improve the stability of the power circuit.

Figure 8:
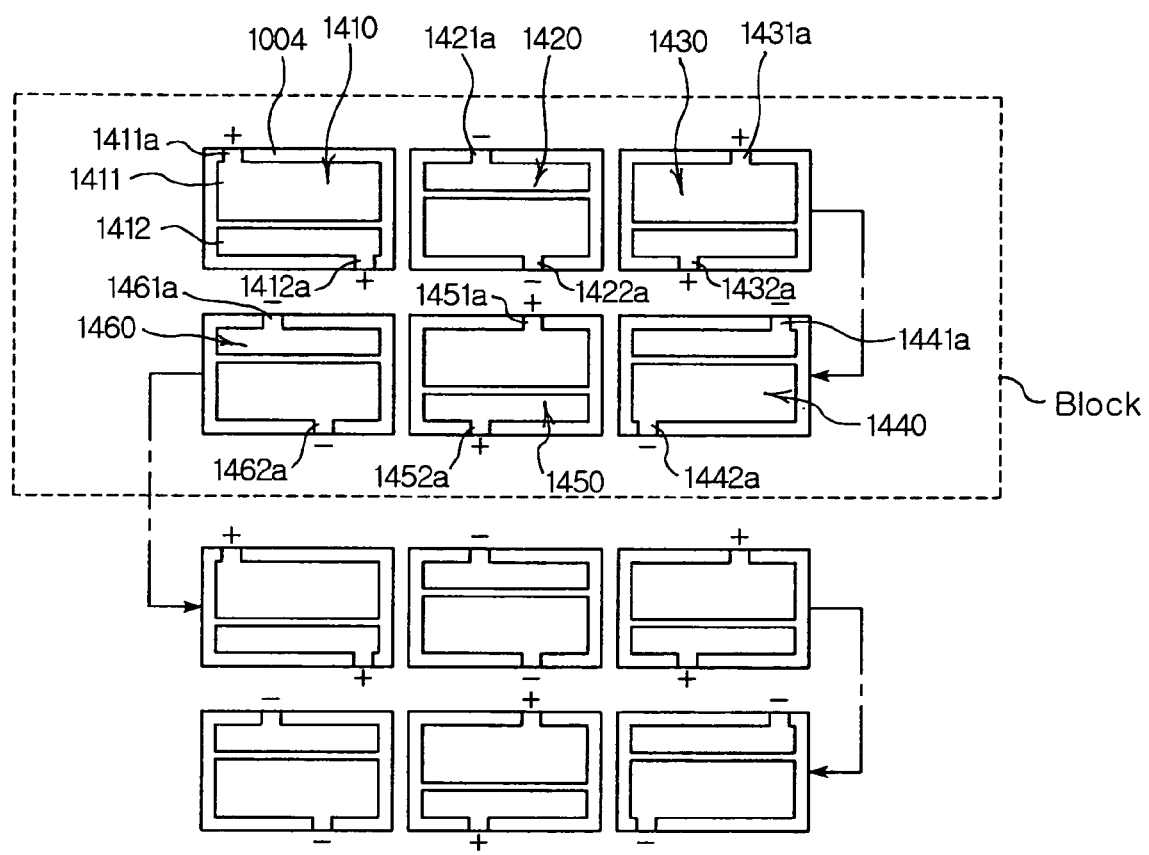
FIGS. 8 to 16 are plan views illustrating internal electrode structures of multilayer chip capacitors according to other embodiments of the invention.

FIG. 8 is a plan view illustrating an internal electrode structure of a multilayer chip capacitor according to other embodiment of the invention. In this embodiment shown in FIG. 8, a pair of coplanar electrode plates have different areas. In particular, in two vertically adjacent internal electrode layers, associated separator slits have different positions in a plane when seen in a plan view. (Herein, such position in a plane will be referred to as "in-plane position.") For example, an internal electrode layer 1410 has a separator slit located near to a lower edge thereof as shown in the drawing, whereas an internal electrode layer 1420 has a separator slit located near to an upper edge thereof as shown in the drawing. In addition, an internal electrode layer 1430 adjacent to the internal electrode layer 1420 has a separator slit located near to a lower side thereof as shown in the drawing. When internal electrode layers are stacked one atop another in this fashion, their separator slits have different in-plane positions.

By varying the in-plane positions of the vertically adjacent separator slits, it is possible to suppress delamination which may take place otherwise in the fabrication of a capacitor. The delamination acts as a factor that adversely affects the reliability of the capacitor.

Except for the positions of the separator slits, this embodiment shown in FIG. 8 is substantially the same as that shown in FIG. 4. Therefore, also in the embodiment shown in FIG. 8, the individual internal electrode layer is divided into a pair of electrode plates (e.g., 1411 and 1412), each of which has one lead, so as to prevent excessively low ESR of the capacitor and resultant instability of a power circuit.

Furthermore, the leads of the vertically adjacent, electrode plates of opposite polarities are arranged to be always horizontally adjacent so as to suppress an increase in the ESL. As in the embodiment of FIG. 4, the leads extending to one face of the capacitor body are arranged in a zigzag shape. In FIG. 8, the reference numeral 1004 indicates dielectric layers, 1410 to 1460 indicate internal electrode layer's, and 1411a to 1462a indicate leads.

Figure 9:
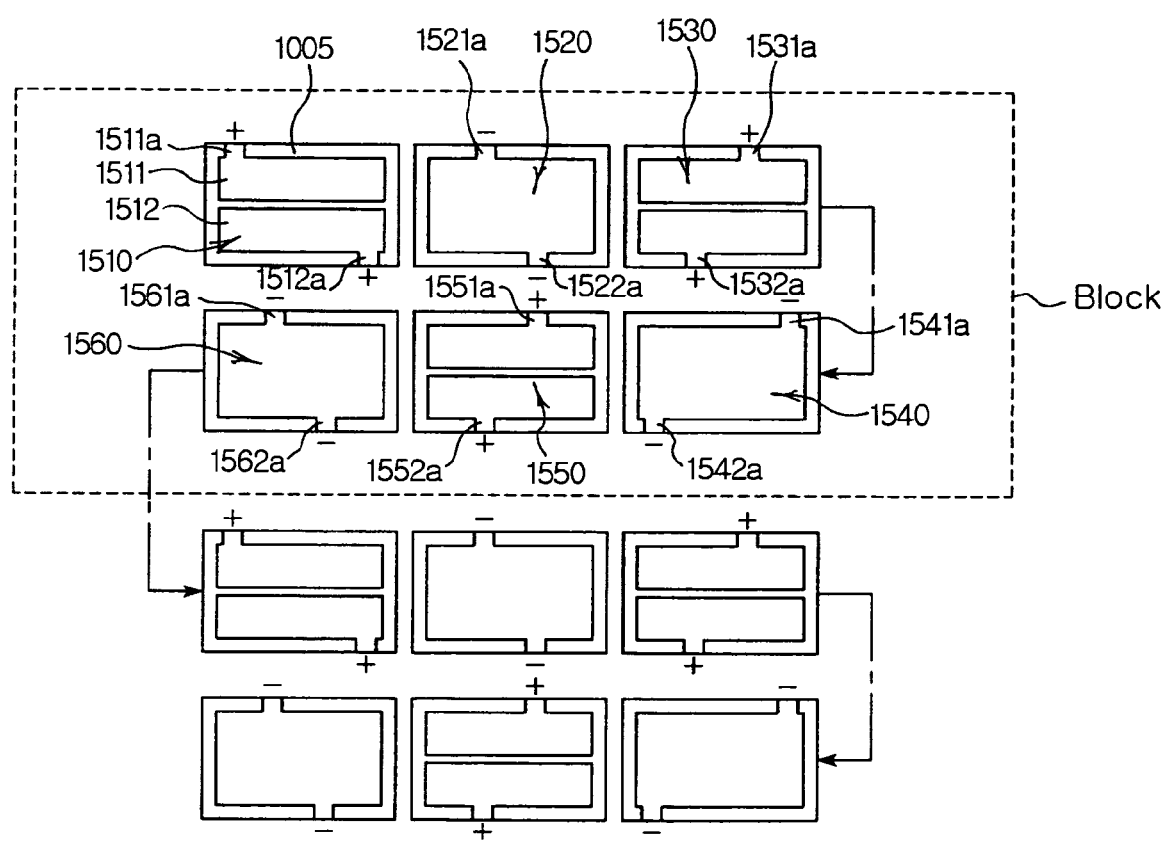

FIG. 9 is a plan view illustrating an internal electrode structure of a multilayer chip capacitor according to further another embodiment of the invention. In this embodiment shown in FIG. 9, some of internal electrode layers in one block are not divided by a separator slit. That is, the block has at least one internal electrode layer (e.g., 1520) which is not divided.

Referring to FIG. 9, six (6) internal electrode layers formed on dielectric layers 1005 constitute one block, in which each of three internal electrode layers 1510, 1530 and 1550 is divided into a pair of electrode plates by a separator slit. The internal electrode structure shown in FIG. 9 is substantially the same as that shown in FIG. 4 except that three internal electrode layers 1520, 1540 and 1560 in the block are not divided.

Describing in more detail, first to sixth internal electrode layers 1510 to 1560 are stacked sequentially one atop another to constitute one block. The first internal electrode layer 1510 is divided into two electrode plates 1511 and 1512 by a separator slit, and in the same fashion, the third and fifth internal electrode layers 1530 and 1550 each are also divided into two electrode plates, respectively. Each electrode plate of the divided internal electrode layers has one lead 1511a, 1512a, 1531a, 1532a, 1551a, 1552a. For example, the electrode plates 1511 and 1512 have the leads 1511a and 1512a, respectively. Each of the second, forth and sixth internal electrode layers 1520, 1540 and 1560 is of a single undivided electrode plate. In addition, the second, fourth and sixth internal electrode layers 1520, 1540 and 1560 each have two leads 1521a and 1522a; 1541a and 1542a; 1561a and 1562a, respectively.

With the divided internal electrode layers 1510, 1530 and 1550 alternating with the undivided internal electrode layers 1520, 1540 and 1560, it is possible to apply substantially uniform pressure in pressing and sintering procedures during manufacturing processes as well as prevent delamination.

According to this embodiment, in one block having six internal electrode layers, at least one internal electrode layer (three internal electrode layers in this case) is divided into a pair of electrode plates by a separator slit, and each electrode plate of the divided internal electrode layer has only one lead. The remaining, undivided electrode layers (1520, 1540 and 1560 in this case) have only two leads, respectively. Therefore, the ESR of the capacitor can generally have a suitable value without having an excessively small value.

Furthermore, as shown in FIG. 9, the leads of the vertically adjacent electrode plates of opposite polarities are arranged to be horizontally adjacent. Furthermore, the leads extending to one face of the capacitor body are arranged in a zigzag shape. Therefore, this embodiment also can suppress an increase in ESL.

Figure 10:
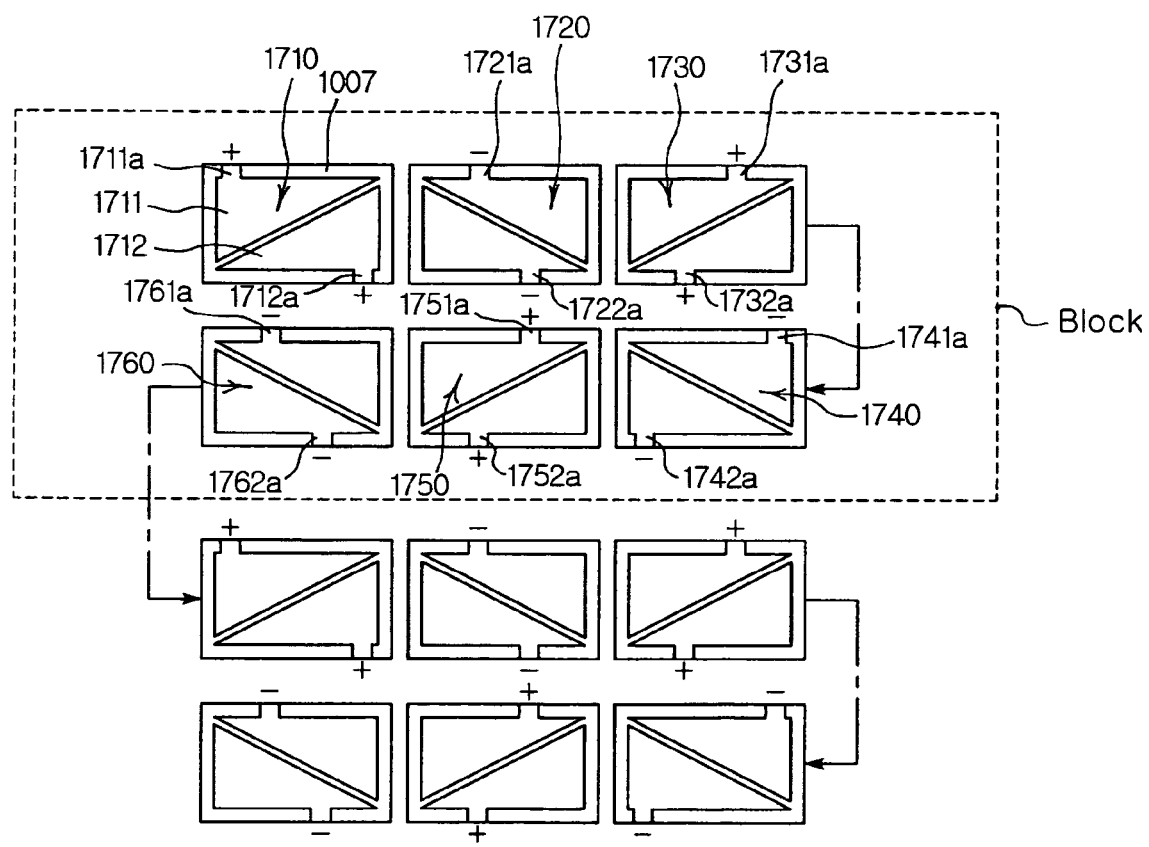

FIG. 10 is a plan view illustrating an internal electrode structure of a multilayer chip capacitor according to further another embodiment of the invention. This embodiment shown in FIG. 10 is substantially the same as that shown in FIG. 4 except for the direction of separator slits for dividing internal electrode layers.

Referring to FIG. 10, separator slits of internal electrode layers 1710 to 1760 on dielectric layers 1007 are extended diagonally. In addition, the separator slits of the vertically adjacent internal electrode layers are extended diagonally in different directions. Therefore, with the internal electrode layers stacked one atop another, the separator slits of the internal electrode layers are located differently.

With the changing diagonal directions of the vertically adjacent separator slits, it is possible to apply substantially uniform pressure in a pressing procedure. This as a result can prevent the delamination inside a capacitor.

In this embodiment also, the individual internal electrode layer (e.g., 1710) is divided into a pair of electrode plates (e.g., 1711 and 1712), each of which has one lead. For example, one plate 1711 has one lead 1711a. This as a result can maintain ESR in a suitable level. Furthermore, the leads of the vertically adjacent electrode plates of opposite polarities are arranged to be horizontally adjacent, thereby suppressing an increase in ESL. The leads extending to one face of the capacitor body are also arranged in a zigzag shape. In the drawing, the reference numerals 1712a to 1762a indicate leads.

Figure 11:
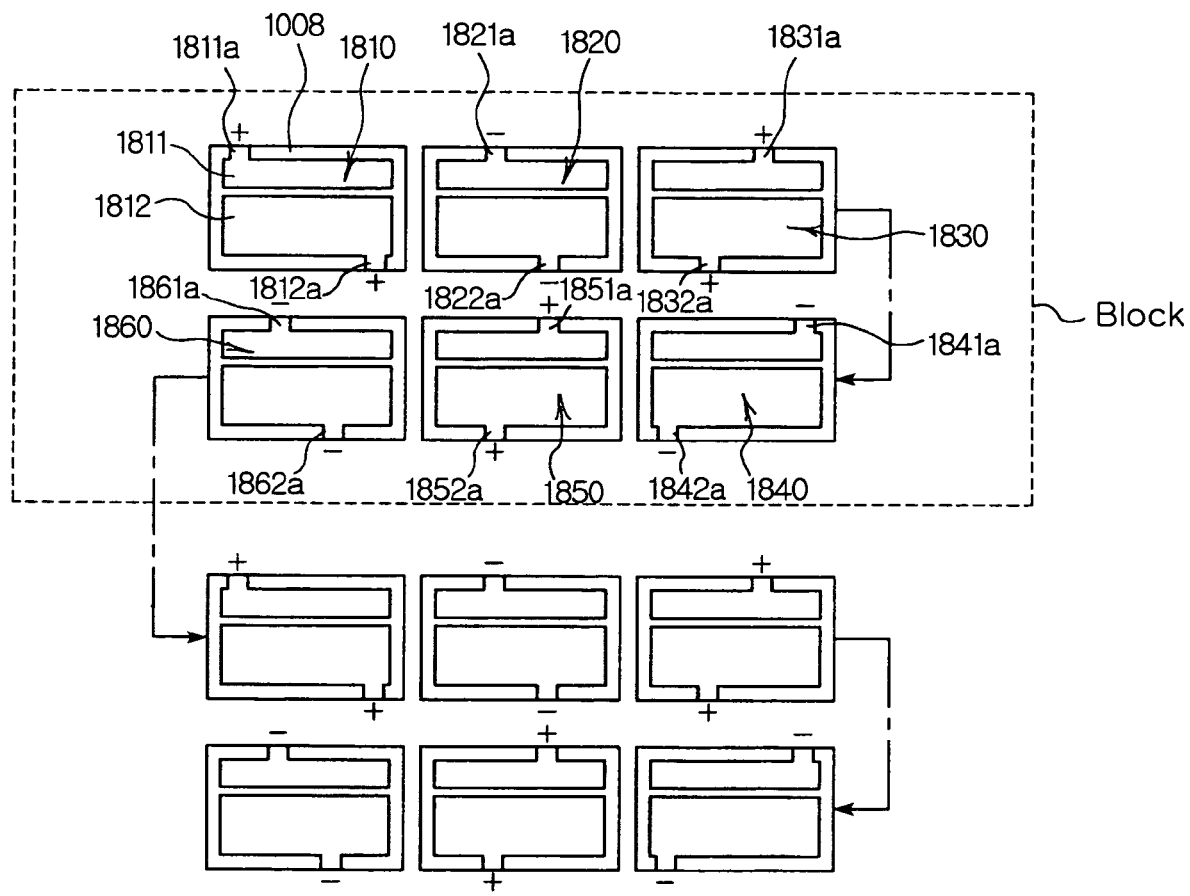

FIG. 11 is a plan view illustrating an internal electrode structure of a multilayer chip capacitor according to other embodiment of the invention. This embodiment as shown in FIG. 11 is different from those shown in FIGS. 4 and 8 in that a pair of coplanar electrode plates (e.g., 1811 and 1812) has different areas, but the separator slits of the internal electrode layers have the same in-plane position. By the separator slits located identically, each of internal electrode layers (e.g., 1810) is divided into a pair of coplanar electrode plates (e.g., 1811 and 1812) having different areas.

As the individual internal electrode layers are divided into electrode plates of the same polarity but different areas by the separator slits located in the same in-plane position, capacitor's ESL of this embodiment can be further reduced over that shown in FIG. 4 without any significant change in overall capacitance. In this embodiment also, the ESR of the capacitor can be maintained in a suitable value and the ESL can be reduced. In the drawing, the reference numeral 1008 indicates dielectric layers, the reference numerals 1810 to 1860 indicate internal electrode layers, and the reference numerals 1811a to 1862a indicate leads.

FIGS. 12 to 17 are plan views illustrating internal electrode structures of eight-terminal multilayer chip capacitors according to other embodiments of the invention. The capacitor as shown in FIGS. 12 to 17 may have an outer configuration as shown in FIG. 18.

Figure 12:
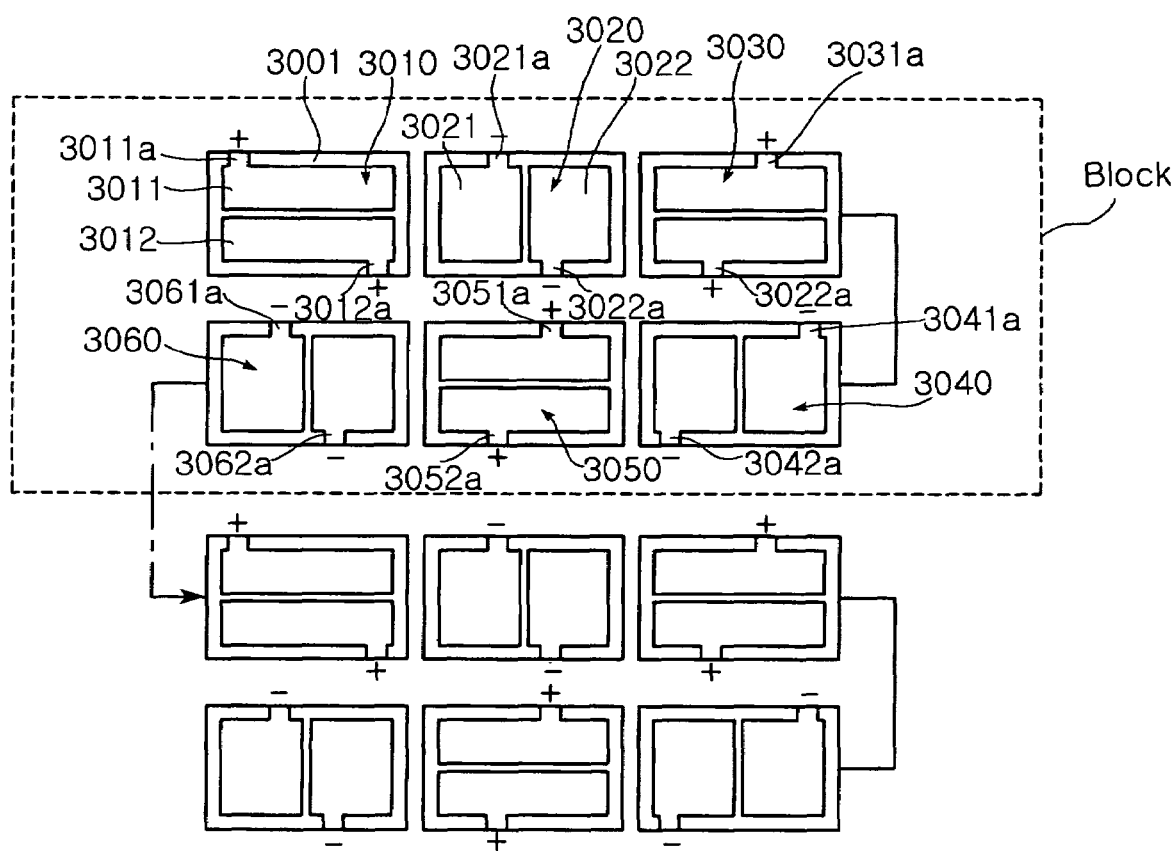

Referring to FIG. 12, this embodiment is substantially the same as that shown in FIG. 4 except that vertically adjacent separator slits are arranged to intersect each other perpendicularly. Each internal electrode layer 3010-3060 formed on a dielectric layer 3001 is divided into a pair of coplanar electrode plates 3011 and 3012; 3021 and 3021; etc. by a separator slit. Each of the electrode plates 3011, 3012, 3021, 3022, etc. has one lead 3011a, 3012a . . . , 3061a, 3062a.

As shown in FIG. 12, in the vertically adjacent internal electrode layers such as 3010 and 3020, the corresponding separator slits are arranged to intersect each other perpendicularly. In particular, separator slits in parallel with the longitudinal direction (e.g., the separator slit of the internal electrode layer 3010) alternate with those perpendicular to the longitudinal direction (e.g., the separator slit of the internal electrode 3020) in a vertical direction (along a stacking direction). With the separator slits arranged alternately to intersect each other perpendicularly in a vertical direction, it is possible to greatly suppress the delamination that may take place in fabrication of a capacitor.

Figure 13:
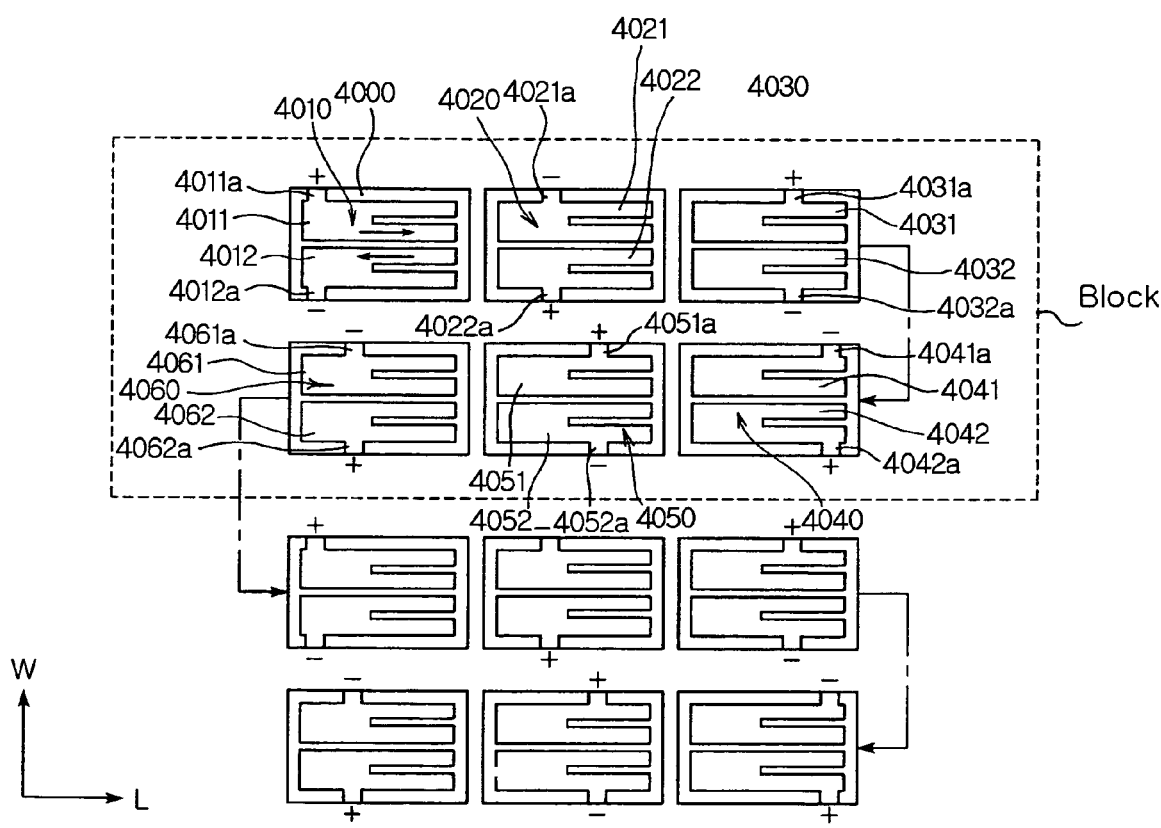

The embodiment as shown in FIG. 13 is substantially the same as that shown in FIG. 2 except that a slit is formed in each electrode plate without dividing the same. (Hereinafter this type of slit will be referred to as "non-separator slit.") Referring to FIG. 13, each of electrode plates 4011, 4012 . . . 4061 and 4062 has a non-separator slit extended from a side of the individual electrode plate to the center. In particular, the non-separator slit is extended in parallel with the longitudinal direction L like the separator slit. The non-separator slit serves to change current flow in the electrode plate.

The non-separator slit prolongs a current path inside the electrode plate (e.g., 4011), thereby increasing resistance against current flowing through the electrode plate. Therefore, the non-separator slit acts to prevent capacitor ESR from being excessively low. Furthermore, by adjusting the length of the non-separator slit, it is possible to suitably control the ESR so that target impedance can be easily obtained and a power distribution network can be easily designed.

Referring to FIG. 13, in a pair of coplanar electrode plates such as 4011 and 4012, currents flow in opposite directions (see the arrows) through adjacent regions of the electrode plates 4011 and 4012 (which are around a separator slit). This as a result obtains an effect of magnetic flux cancellation around the separator slit. Such an effect of magnetic flux cancellation acts as a factor for decreasing capacitor ESL.

In addition, currents flow in opposite directions through the vertically adjacent electrode plates (e.g., 4011 and 4021), thereby giving an effect of magnetic flux cancellation between the vertically adjacent electrode plates. As a result, the capacitor ESL is further reduced and the stability of the power circuit is more enhanced.

According to this embodiment, the non-separator slits have the same in-plane position in the vertically adjacent electrode plates such as 4011 and 4021. That is, the non-separator slits which are adjacent to each other in a vertical direction overlap each other. As the vertically adjacent non-separator slits are arranged to overlap each other, it is possible to suppress capacitance loss owing to the non-separator slits as much as possible. In FIG. 13, the reference numeral 4000 indicates the dielectric layers, the reference numerals 4010 to 4060 indicate internal electrode layers, and the reference numerals 4011a to 4062a indicate leads.

Figure 14:
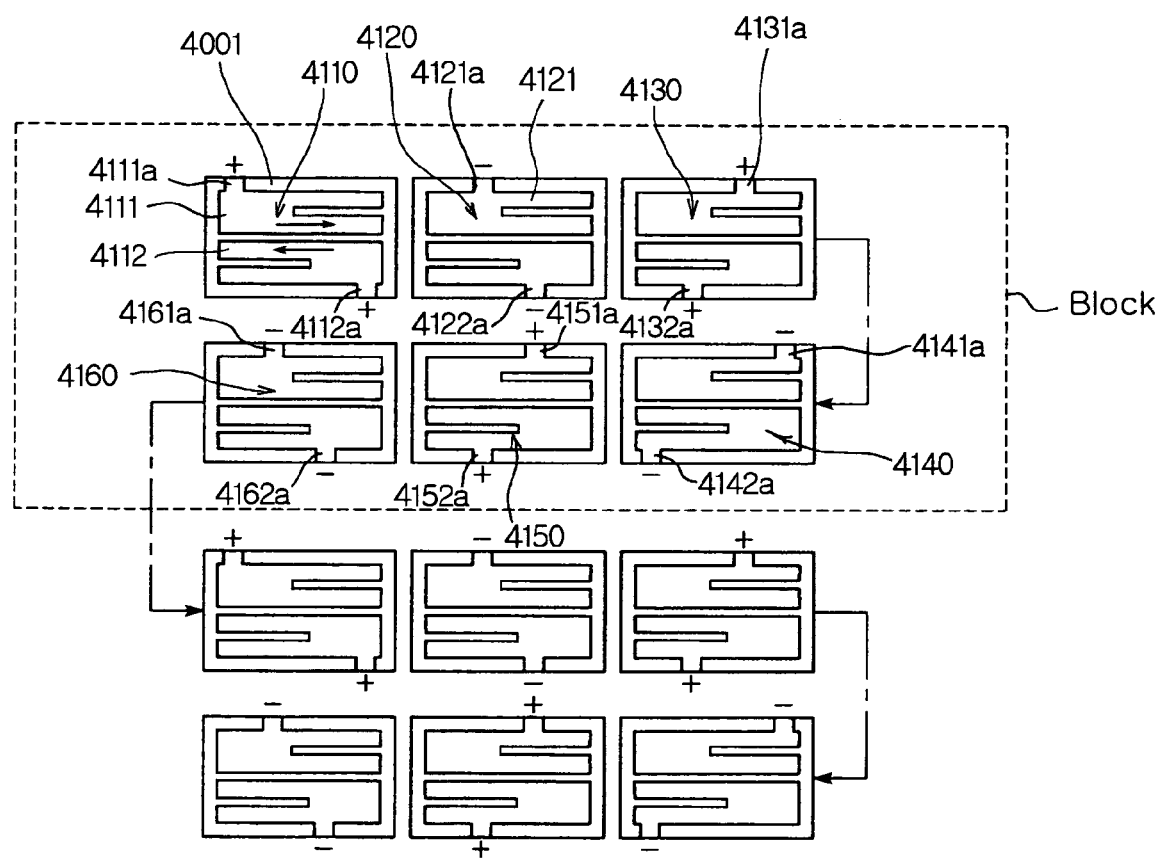

The embodiment as shown in FIG. 14 is substantially the same as that in FIG. 4 except that a non-separator slit is formed in each electrode plate. That is, each of electrode plates 4111, 4112, 4121, 4122, etc. has a non-separator slit extended from one side to the center thereof. In this embodiment also, the non-separator slits are extended in the longitudinal direction L like separator slits to change current flows in the electrode plates. As a result, also in the embodiment of FIG. 14, those effects (such as ESR control and ESL reduction) as above-described with reference to FIG. 13 can be obtained.

In this embodiment also, the non-separator slits of the vertically adjacent electrode plates (e.g., 4111 and 4121) have the same in-plane position. Thus, it is possible to suppress capacitance loss owing to the non-separator slits. In FIG. 14, the reference numeral 4001 indicates dielectric layers, the reference numerals 4110 to 4160 indicate internal electrode layers, and the reference numerals 4111a to 4162a indicate leads.

Figure 15:
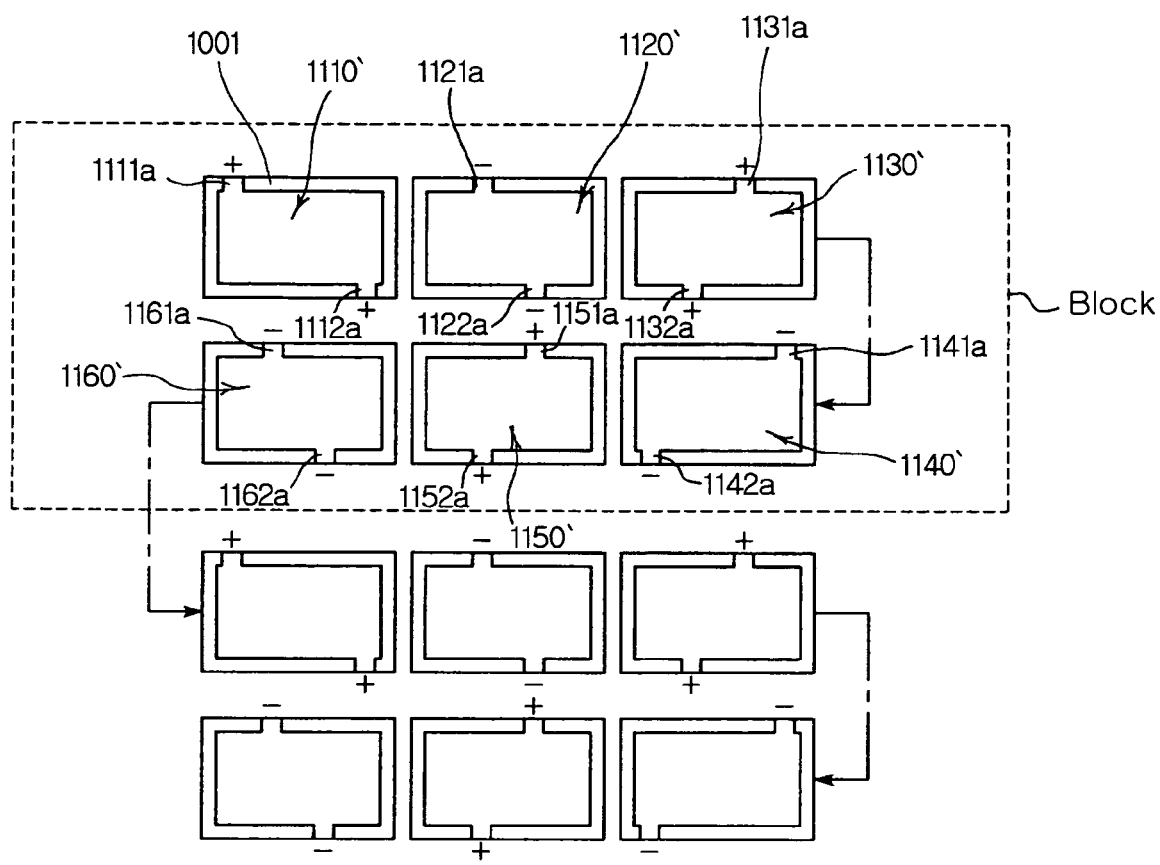

FIG. 15 is a plan view illustrating an internal electrode structure of an eight-terminal multilayer chip capacitor according to an alternative embodiment of the invention. In the embodiment of FIG. 15, each internal electrode layer is composed of a single electrode plate which is not divided. The internal electrode structure of FIG. 15 corresponds to a structure produced by connecting two divided, coplanar electrode plates (e.g., 1111 and 1112) of the internal electrode structure of FIG. 4 into one plate.

Referring to FIG. 15, first to sixth internal electrode layers 1110', 1120', 1130', 1140', 1150' and 1160' on dielectric layers 1001 constitute one block. Each of the internal electrode layers 1110' to 1160' is made of an undivided single structure, that is, one electrode plate. Each electrode plate has two leads 1111*a*, 1112*a*; 1121*a*, 1122*a*; 1131*a*, 1132*a*; 1141*a*, 1142*a*; 1151*a*, 1152*a*; or 1161*a*, 1162*a* which are extended two opposite faces of a capacitor body. (Each electrode plate has two leads each of which is extended to each of the opposite faces.) The leads 1111*a* to 1162*a* provide an electric connection to external electrodes (see the reference numerals 131 to 138 of FIG. 18) to electrically connect the internal electrode layers 1110' to 1160' to the external electrodes 131 to 138.

According to this embodiment, each of the internal electrode layers 1110' to 1160' has only two leads 1111*a*, 1112*a*; 1121*a*, 1122*a*; 1131*a*, 1132*a*; 1141*a*, 1142*a*; 1151*a*, 1152*a*; or 1161*a*, 1162*a* so that the capacitor can have a suitable value of ESR which is not excessively small.

Furthermore, since each internal electrode layer is composed of one electrode plate (i.e., undivided single structure), stepped portions (or thickness difference) rarely take place in fabrication process and negative effects due to such stepped portions are thus reduced. With no sacrifice in capacitance due to separator slits, this embodiment has a higher capacitance over those embodiments having the separator slits. In this embodiment also, leads (e.g., 1111*a* and 1121*a*) of vertically adjacent electrode plates having different polarities are arranged always horizontally adjacent to each other. This as a result can suppress ESL enhancement factors. In this embodiment, the leads (e.g., 1111*a*, 1121*a*, 1131*a*, 1141*a*, 1151*a*, 1161*a*) extended to one face of the capacitor body are also arranged in a zigzag shape as in the embodiment of FIG. 4.

Figure 16:
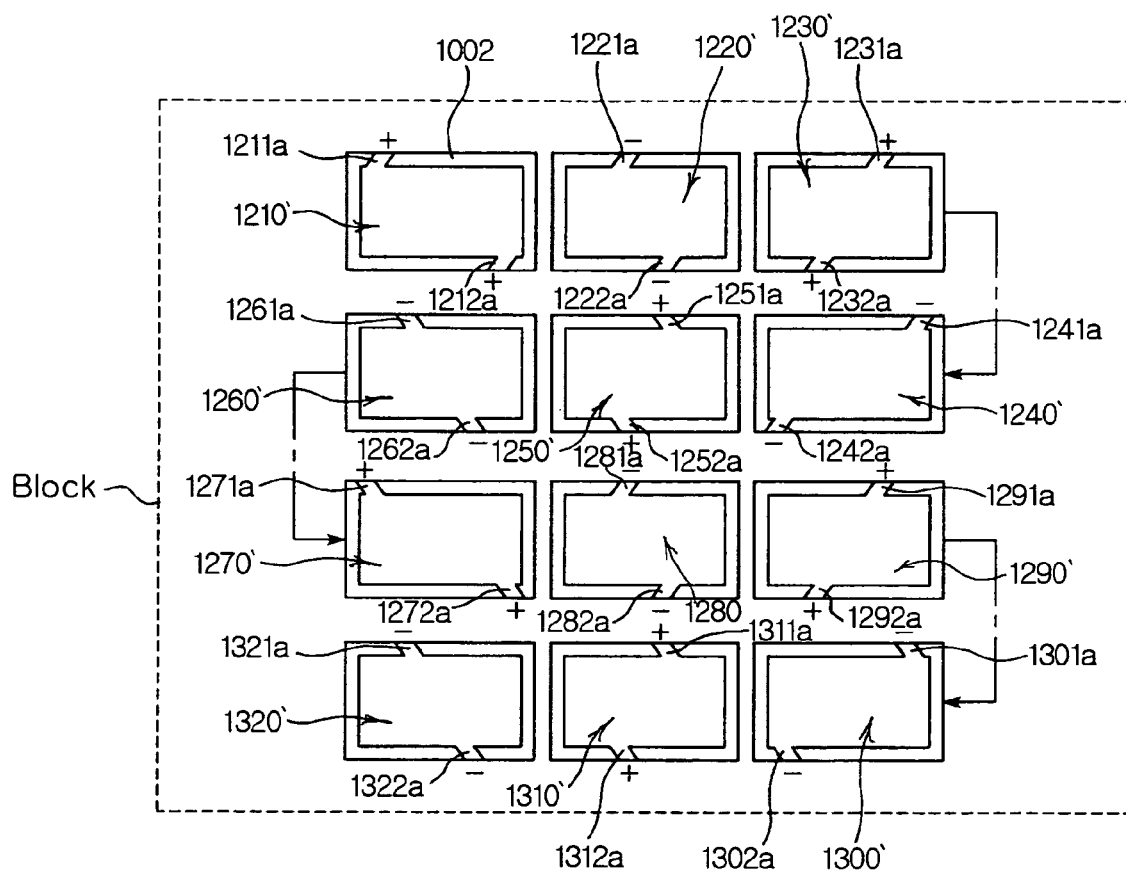

FIG. 16 is a plan view illustrating an internal electrode structure of a variation to the eight-terminal multilayer chip capacitor shown in FIG. 15. In this embodiment of FIG. 16, vertically adjacent ones (e.g., 1211*a*, 1271*a*; 1221*a*, 1261*a*; 1231*a*, 1251*a*; 1232*a*, 1252*a*) of the leads connected to a common external electrode are extended in different directions with a predetermined angle therebetween. The internal electrode structure of FIG. 16 corresponds to a structure produced by connecting two divided, coplanar electrode plates (e.g., 1211 and 1212) of the internal electrode structure of FIG. 6 into one plate.

Referring to FIG. 16, twelve (12) internal electrode layers 1210' to 1320' formed on dielectric layers 1002 are stacked successively one atop another to constitute a block. A plurality of such blocks are stacked repeatedly one atop another to produce a capacitor body (see the reference numeral 120 in FIG. 18). Each of the internal electrode layers 1210' to 1320' is composed of one electrode plate (i.e., undivided single structure), and each electrode plate has two leads (any pair of 1211*a* and 1212*a* to 1321*a* and 1322*a*) extended opposite faces of the capacitor body. The leads 1211*a* and 1212*a* to 1321*a* and 1322*a* provide connection to external electrodes (see the reference numerals 131 to 138 of FIG. 18).

With each of the internal electrode layers 1210' to 1320' having only two leads, it is possible to prevent excessive reduction in capacitor ESR and associated circuit instability. In addition, the leads (e.g., 1211*a* and 1121*a*) of the vertically adjacent plates having different polarities are arranged always adjacent to each other in a horizontal direction. This as a result can suppress ESL enhancement factors. Furthermore, since each of the internal electrode layers 1210' to 1320' is composed of an undivided single electrode plate, stepped portions rarely take place in fabrication process and negative effects due to such stepped portions are thus reduced. With no sacrifice in capacitance due to separator slits, this embodiment has a higher capacitance over those embodiments having the separator slits. In this embodiment also, the leads (e.g., 1211*a*, 1221*a*, 1231*a*, 1241*a*, 1251*a*, 1261*a*, 1271*a*, 1281*a*, 1291*a*, 1301*a*, 1311*a* and 1321*a*) extended to one face of the capacitor body are arranged in a zigzag shape.

Particularly, in this embodiment, vertically adjacent leads connected to a common external electrode (e.g., the leads 1211*a* and 1271*a*; 1221*a* and 1261*a*; 1231*a* and 1251*a*; 1232*a* and 1252*a*) are extended in different directions with a predetermined angle therebetween. This feature is clearly shown in an enlarged fragmentary view of FIG. 17. As shown in FIG. 17, the leads 1211*a* and 1271*a* commonly connected to the external electrode 131 are extended in different direction with a predetermined angle therebetween. Preferably, the angle α is in the range from 45° to 135°.

When the adjacent leads such as 1211*a* and 1271*a* connected to the common external electrode are extended in different directions with a predetermined angle therebetween, currents flow through adjacent ones of the leads 1211*a* and 1271*a* in different directions. This brings about an effect of suppressing magnetic flux enhancement between the adjacent leads 1211*a* and 1271*a*, and thus strong mutual inductance does not take place in the adjacent leads connected to the same external electrode. As a result, the ESL of the capacitor is further lowered.

FIGS. 19 to 22 are plan views illustrating internal electrode structure of ten-terminal multilayer chip capacitors according to embodiments of the invention. The exterior structure of such a ten-terminal capacitor is shown in FIG. 23. Referring to FIG. 23, the capacitor 200 includes ten external electrodes 231 to 240 formed on the exterior of a capacitor body 220. The external electrodes 231 to 240 are arranged with alternating polarities on the exterior of the capacitor body 220.

Figure 19:
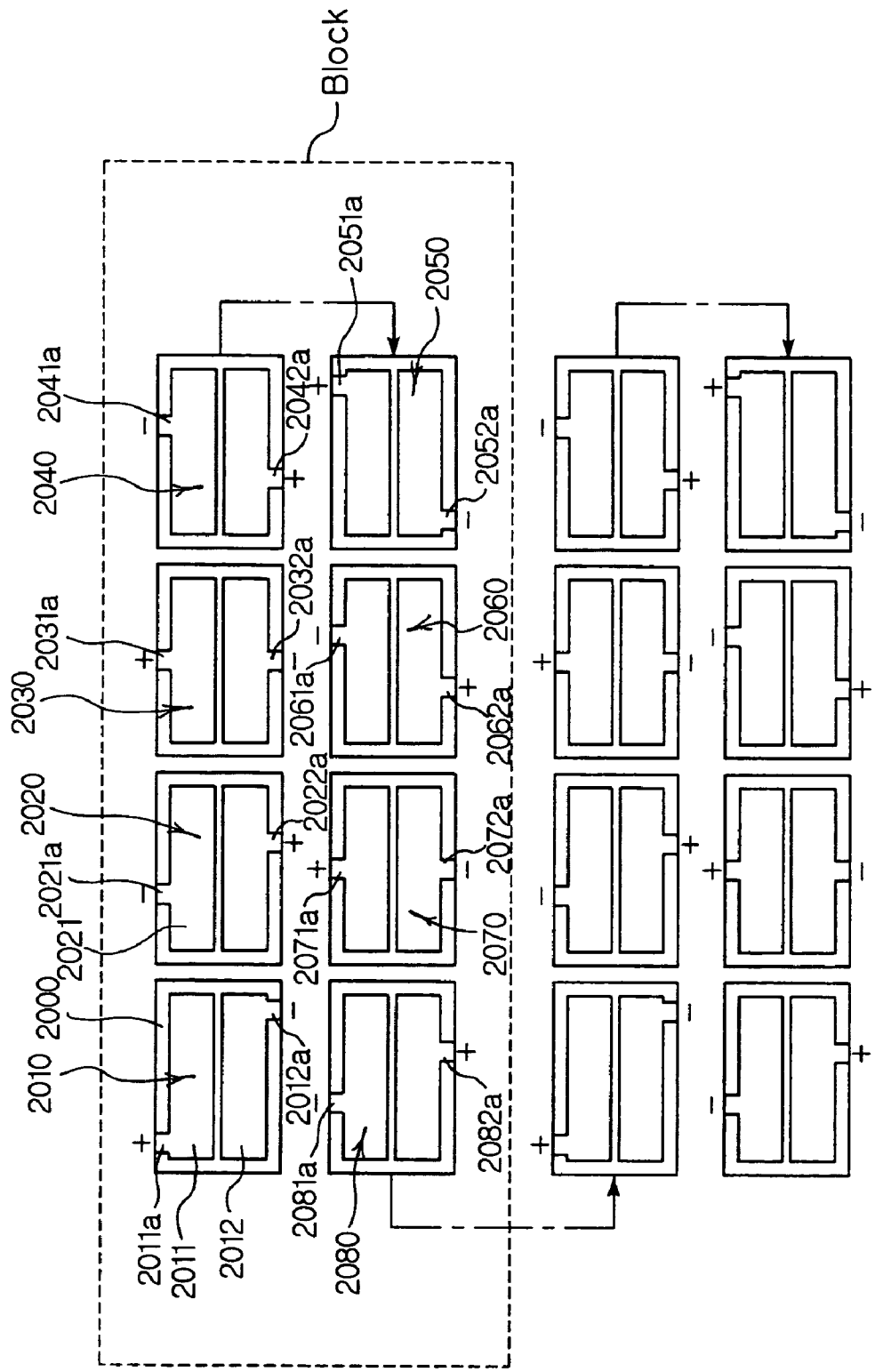
FIGS. 19 and 20 are plan views illustrating internal electrode structures of multilayer chip capacitors according to another embodiments of the invention.

Referring to FIG. 19, eight (8) internal electrode layers 2010 to 2080 formed on dielectric layers 2000 are stacked-successively one atop another to constitute one block. A plurality of such blocks are stacked repeatedly to produce a capacitor body (see the reference numeral 220 of FIG. 23). The internal electrode layer 2010 is divided into a pair of coplanar electrode plates or coplanar electrode plate pair 2011 and 2012 by a separator slit. Each of the other internal electrode layers 2020 to 2080 is also divided-into coplanar electrode plate pair in the same fashion. The pair of coplanar electrode plates (e.g., 2011 and 2012) have opposite polarities. Opposing electrode plates such as 2011 and 2021 constitute a capacitive element.

As shown in FIG. 19, each electrode plate (e.g., 2011) has one lead (e.g., 2011*a*). The leads 2011*a* to 2082*a* provide a connection to the external electrodes (see the reference numerals 231 to 240 of FIG. 23) to electrically connect the internal electrode layers 2010 to 2080 to the external electrodes 231 to 240. In this embodiment also, the leads (e.g., 2011*a*, 2021*a*, 2031*a*, 2041*a*, 2051*a*, 2061*a*, 2071*a* and 2081*a*) extended to one side face of the capacitor body are arranged in a zigzag shape along the stacking direction. In detail, first to fifth leads 2011*a*, 2021*a*, 2031*a*, 2041*a* and 2051*a* are connected to first to fifth external electrodes 231 to 235, respectively. A sixth lead 2061*a* is connected to the fourth external electrode 234, a seventh lead 2071*a* is connected to the third external electrode 233, and an eighth lead 2081*a* is connected to the second external electrode 232.

According to this embodiment, each of the internal electrode layers is divided into two (or a pair of) electrode plates and each of the electrode plates has one lead. Therefore, it is possible to maintain capacitor ESR in a suitable level, and thus prevent any instability of a power circuit owing to excessively low ESR.

In addition, the leads (e.g., 2011*a* and 2021*a*) of the vertically adjacent electrode plates (e.g., 2011 and 2021) of opposite polarities are arranged to be always horizontally adjacent.

That is, leads of vertically adjacent electrode plates of opposite polarities are always connected to horizontally adjacent external electrodes, respectively. For example, the lead 2011a is arranged to be connected to the external electrode 231, and the lead 2021a is arranged to be connected to the external electrode 232 adjacent to the external electrode 231. Thus, it is possible to suppress ESL enhancement factors. Furthermore, those leads extending to one face of the capacitor body are arranged in a zigzag shape along a stacking direction. As a result, the suitable ESR value and the reduced ESL can further enhance power circuit stability.

Figure 20:
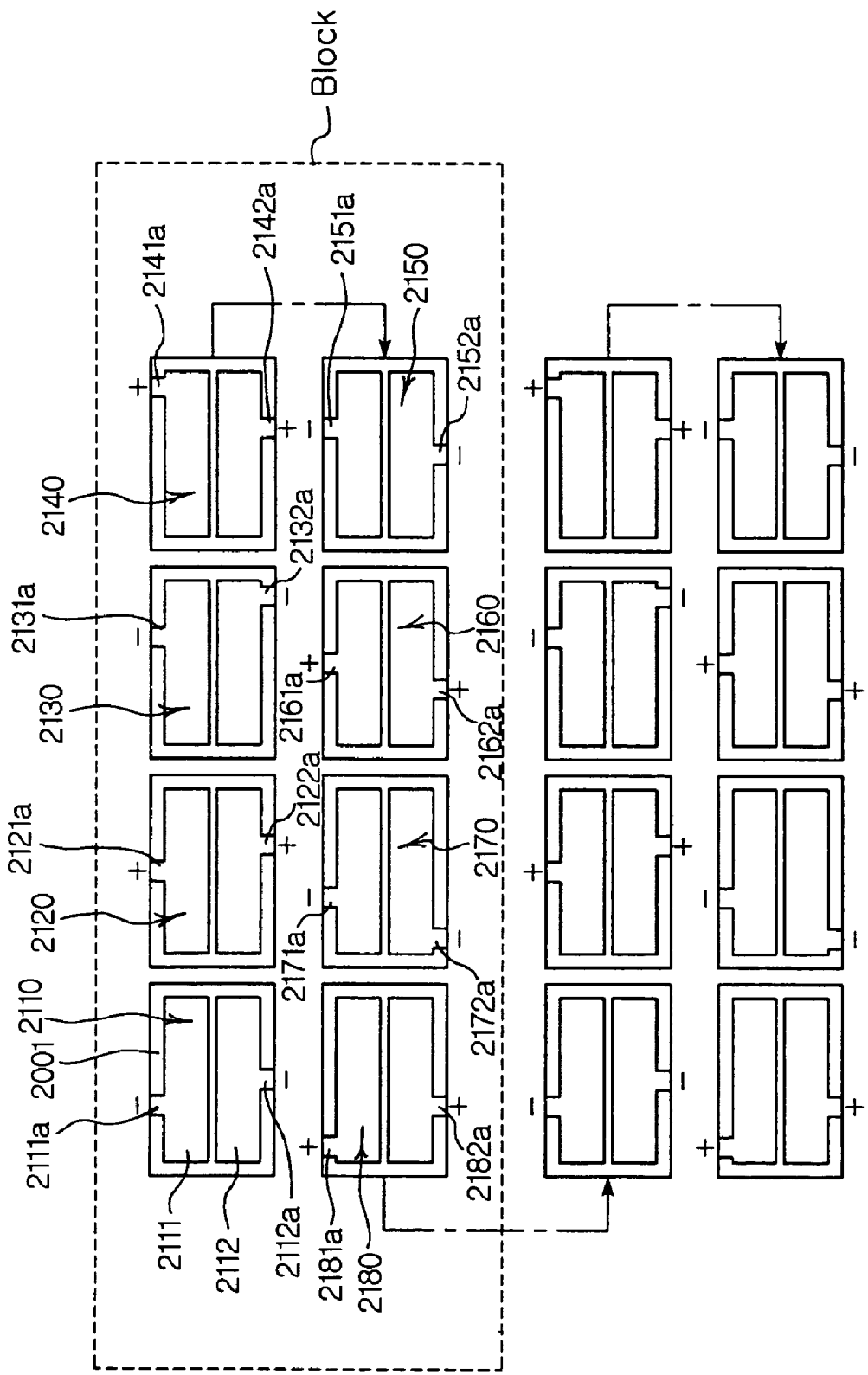

FIG. 20 is a plan view illustrating an internal electrode structure of a ten-terminal multilayer chip capacitor according to another embodiment of the invention. This embodiment shown in FIG. 20 is distinguished from the embodiment as illustrated in FIG. 19 in that a pair of coplanar electrode plates have the same polarity.

Referring to FIG. 20, each of internal electrode layers 2110 to 2180 formed on dielectric layers 2001 is divided into a pair of electrode plates on the same plane by a separator slit. Each electrode plate (e.g., 2111) has only one lead (e.g., 2111a). Such leads 2111a to 2182a provide a connection to the external electrodes (see the reference numerals 231 to 240 in FIG. 23) to electrically connect the internal electrode layers 2110 to 2180 to the external electrodes 231 to 240.

Figure 21:
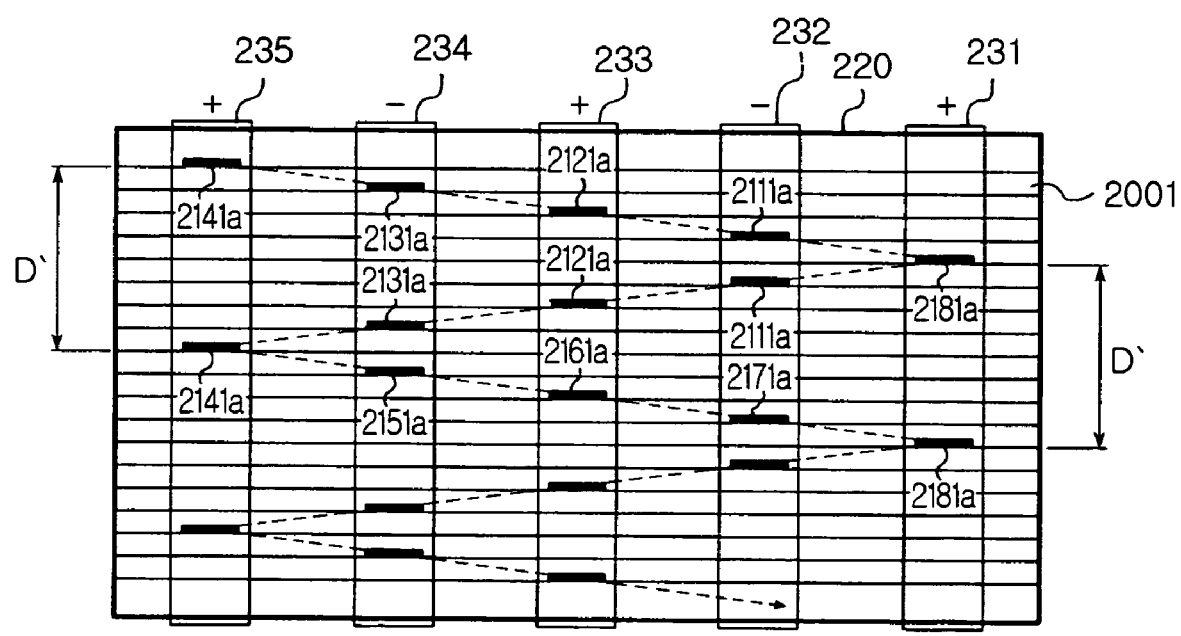
FIG. 21 is a plan view illustrating an arrangement of the leads extending to a side face of a body of the multilayer chip capacitor shown in FIG. 22.

FIG. 21 is a side elevation view illustrating the arrangement of leads extending to one face of the capacitor shown in FIG. 20. Referring to FIG. 21, leads (e.g., 2111a, 2121a, 2131a, 2141a, 2151a, 2161a, 2171a and 2181a) extended to one face of the capacitor body are arranged in a zigzag shape (see dotted line of FIG. 21). As mentioned above, this as a result can suppress mutual inductance between leads connected to a common external electrode and thereby further lower ESL. This embodiment can produce a suitable ESR value together with a low ESL value. In FIG. 21, the reference numeral D' indicates the distance between the leads 2181a.

Figure 22:
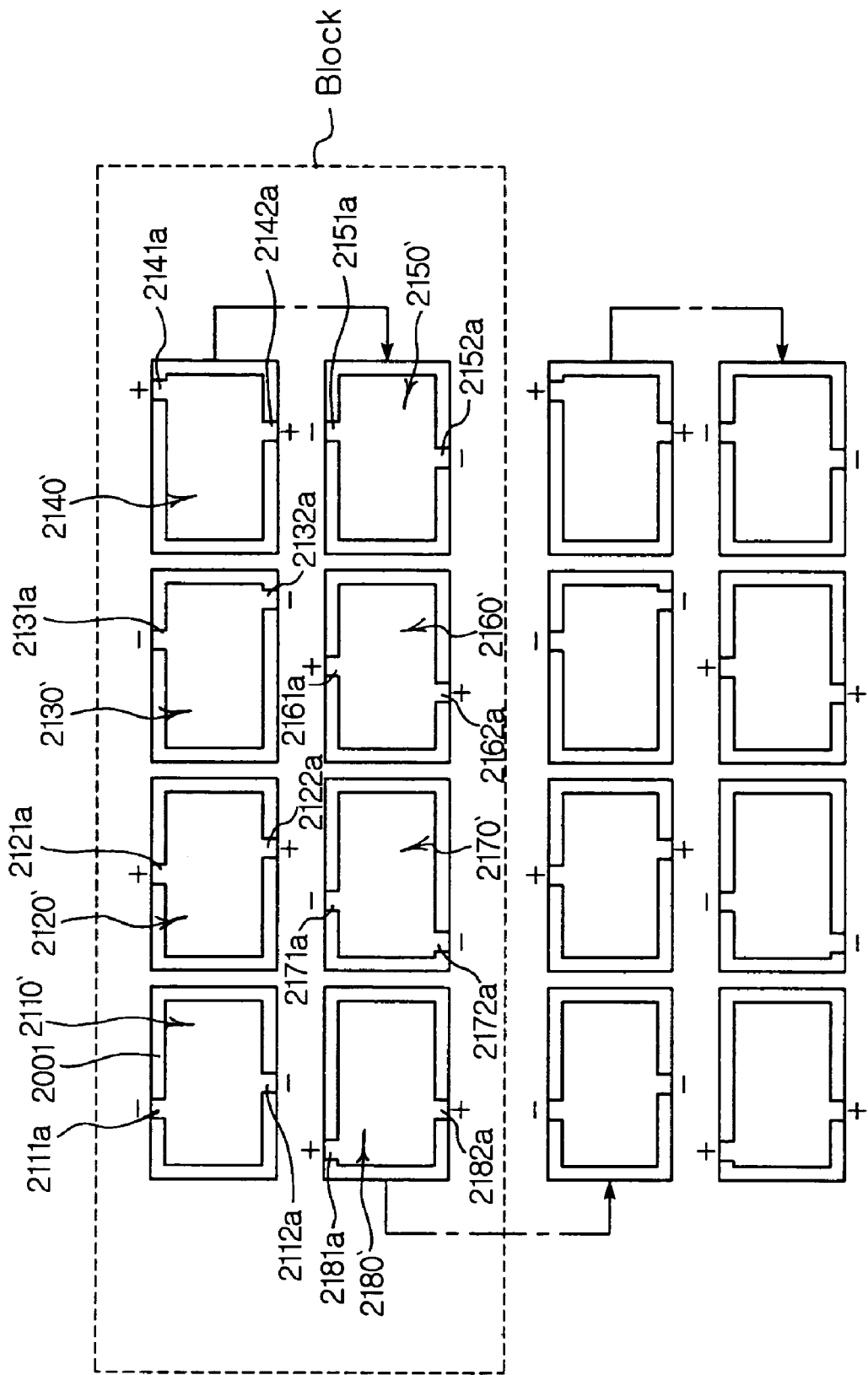
FIG. 22 is a plan view illustrating an internal electrode structure according to a variation to the multilayer chip capacitor of the invention.
Figure 23:
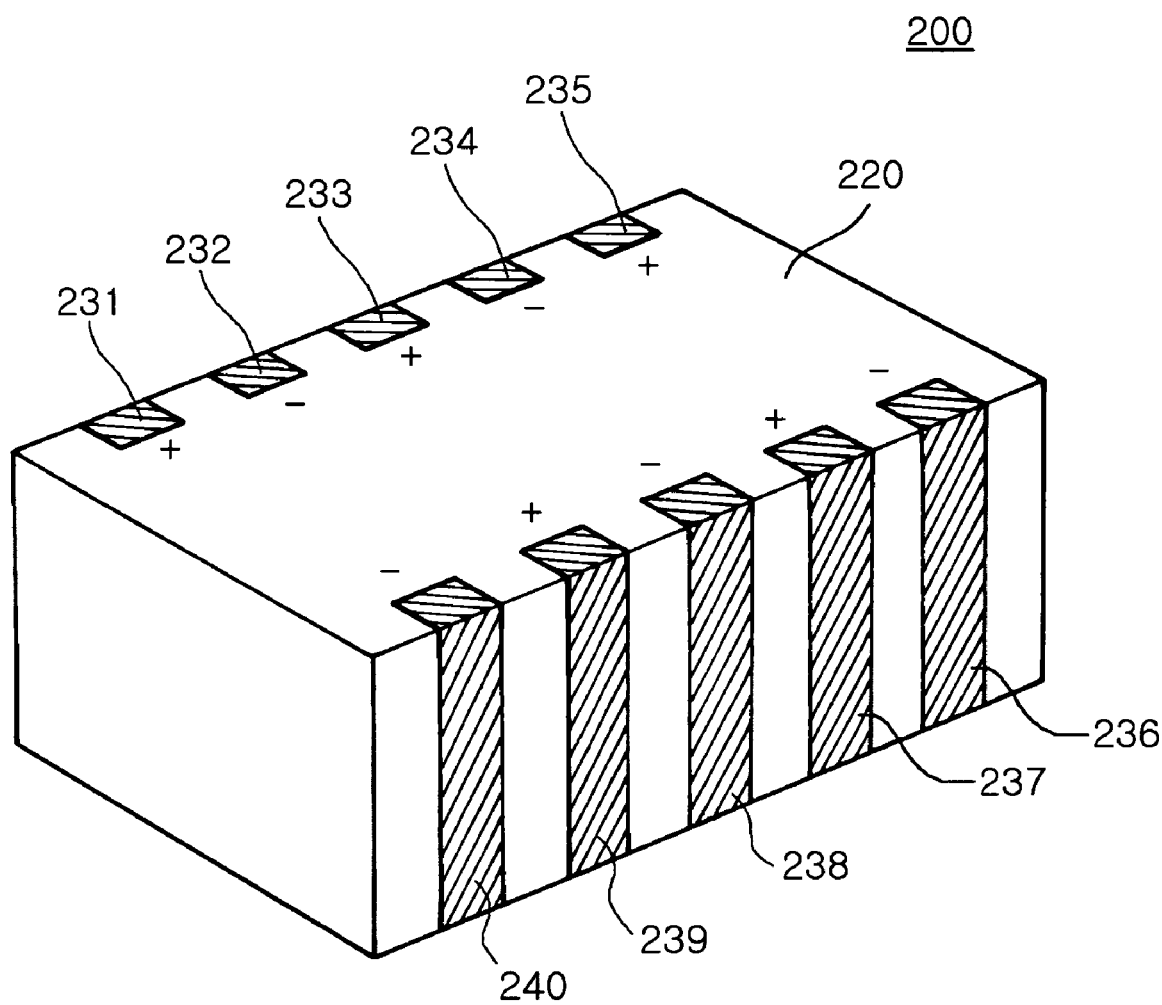
FIG. 23 is a perspective view illustrating an exterior of a ten-terminal multilayer chip capacitor according to an embodiment of the invention.

FIG. 22 is a plan view illustrating an internal electrode structure of a ten-terminal multilayer chip capacitor according to yet another embodiment of the invention. In the embodiment of FIG. 22, each internal electrode layer is composed of an undivided electrode plate, i.e., a single electrode plate which is not divided. The internal electrode structure of FIG. 22 corresponds to a structure produced by connecting two divided, coplanar electrode plates (e.g., 2111 and 2112) of the internal electrode structure of FIG. 20 into one plate.

Referring to FIG. 22, eight internal electrode layers 2110', 2120', 2130', 2140', 2150', 2160', 2170' and 2180' on dielectric layers 2001 constitute one block. Each of the internal electrode layers 2110' to 2180' is made of an undivided single structure, that is, one electrode plate. Each electrode plate has two leads (one pair of reference numerals 2111a and 2112a to 2181a and 2182a) which are extended two opposite faces of a capacitor body. (Each electrode plate has two leads each of which is extended to each of the opposite faces.) The leads 2111a to 2182a provide an electric connection to external electrodes (see the reference numerals 231 to 240 of FIG. 15) to electrically connect the internal electrode layers 2110' to 2180' to the external electrodes 231 to 240.

According to this embodiment, each of the internal electrode layers 2110' to 2180' has only two leads 2110', 2112a; 2121a, 2122a; 2131a, 2132a; 2141a, 2142a; 2151a, 2152a; 2161a, 2162a; 2171a, 2172a; or 2181a, 2182a so that the capacitor can have a suitable value of ESR which is not excessively small.

Furthermore, since each internal electrode layer is composed of one electrode plate (i.e., an undivided single structure), stepped portions (or thickness difference) rarely take place in fabrication process and negative effects due to such stepped portions are thus reduced. With no sacrifice in capacitance due to separator slits, this embodiment has a higher capacitance over those embodiments having the separator slits. In this embodiment also, leads (e.g., 2111a and 2121a) of vertically adjacent electrode plates having different polarities are arranged always adjacent to each other in a horizontal direction. This as a result can suppress ESL enhancement factors. Also, in this embodiment, the leads (e.g., 2111a, 2121a, 2131a, 2141a, 2151a, 2161a, 2171a, and 2181a) extended to one face of the capacitor body are arranged in a zigzag shape.

Figure 24:
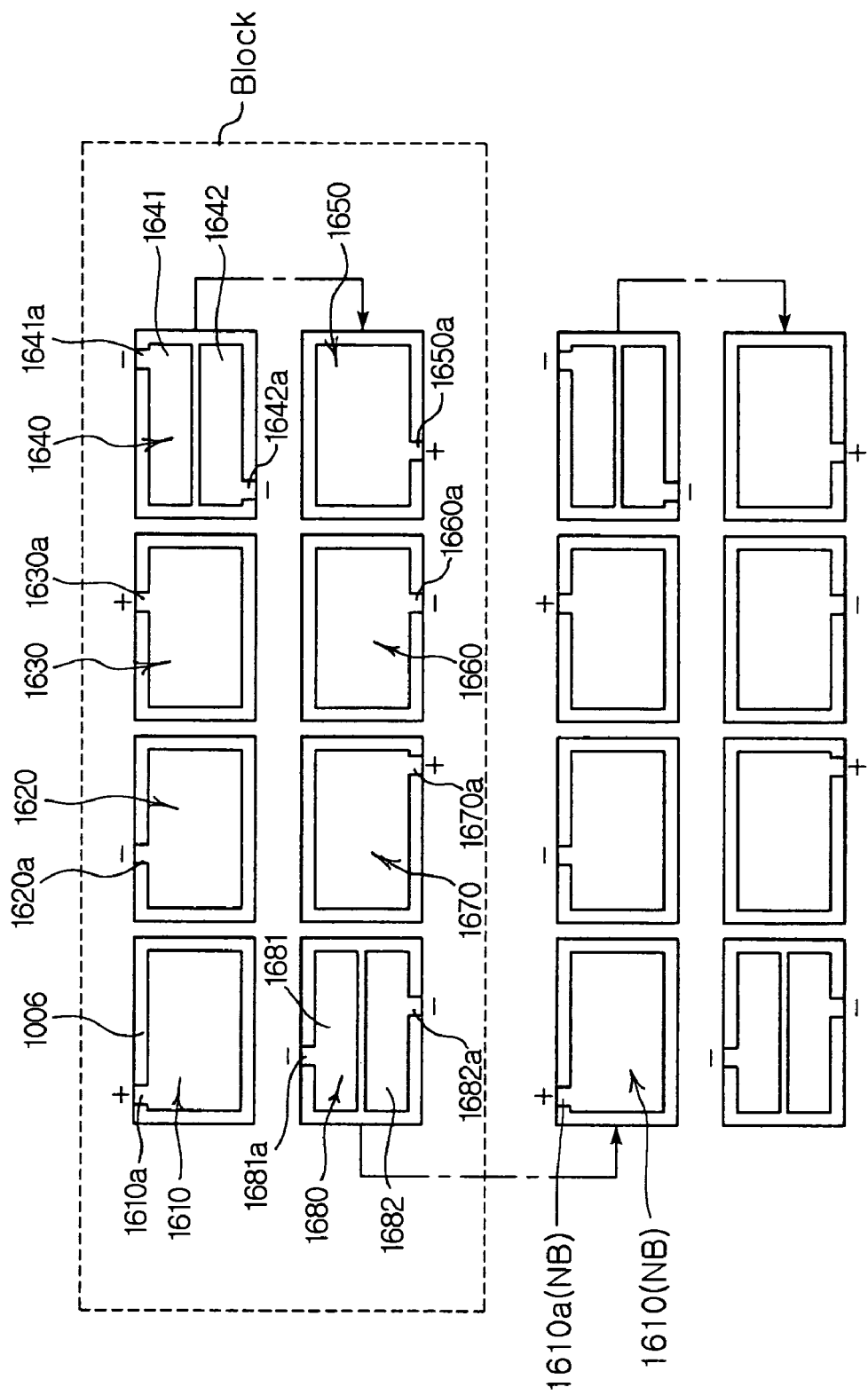
FIGS. 24 and 25 are plan views illustrating internal electrode structures of multilayer chip capacitors according to other embodiments of the invention.

FIG. 24 illustrates an internal electrode structure of a multilayer chip capacitor according to other embodiment of the invention. The capacitor of FIG. 24 corresponds to an eight-terminal multilayer chip capacitor, the exterior structure of which is shown in FIG. 18.

Referring to FIG. 24, first to eighth internal electrode layers 1610 to 1680 on dielectric layers 1006 constitute one block. Among the eight internal electrode layers 1610 to 1680, each of two internal electrode layers has two leads, and each of the other six internal electrode layers has one lead. That is, each of the fourth and eighth electrode layers 1604 and 1680 has two leads 1641a, 1642a or 1681a, 1682a extended to opposite faces of the capacitor body 120, and each of the remaining first to third and fifth to seventh internal electrode layers 1610 to 1630 and 1650 to 1670 has one lead 1610a, 1620a, 1630a, 1650a, 1660a or 1670a.

Particularly, in this embodiment, each of the fourth and eight internal electrode layers 1640 and 1680 is divided-into two electrode plates 1641, 1642 or 1681, 1682 by a separator slit. Each of the first to third and fifth to seventh electrode layers 1610 to 1630 and 1650 to 1670 is composed of one electrode plate which is not divided.

Also, in this embodiment, the leads of the vertically adjacent plates having different polarities are always adjacent to each other in a horizontal direction. To provide such features, the capacitor of FIG. 24 adopts a lead arrangement structure as follows.

The leads 1610a to 1630a of the first to third internal electrode layers 1610 to 1630 are arranged adjacent sequentially in a horizontal direction. Likewise, the leads 1650a to 1670a of the fifth to seventh internal electrode layers 1650 to 1670 are arranged adjacent sequentially in a horizontal direction.

A first lead 1641a of the fourth internal electrode layer 1640 is arranged horizontally adjacent to the lead 1630a of the third internal electrode layer 1630. In addition, a second leads 1642a of the fourth internal electrode 1640 is arranged horizontally adjacent to the lead 1650a of the fifth internal electrode layer 1650. Accordingly, the leads 1641a and 1642a of the fourth internal electrode layer 1640 are arranged horizontally adjacent to the leads 1630a and 1650a of the third and fifth internal electrode layers 1630 and 1650 (i.e., the internal electrode layers vertically adjacent to the fourth internal electrode layer 1640), respectively.

A third lead 1681a of the eighth internal electrode layer 1680 is arranged horizontally adjacent to the lead 1610a(NB) of the first internal electrode layer 1610 (NB) of an adjacent block NB. In addition, a fourth lead 1682a of the eighth internal electrode layer 1680 is arranged horizontally adjacent to the lead 1670a of the seventh internal electrode layer 1670. Accordingly, the leads 1681a and 1682a of the eighth internal electrode layer 1680 are arranged horizontally adjacent to the leads 1610a(NB) and 1670a of the first and seventh internal electrode layers 1610 (NB) and 1670 (i.e., the internal electrode layers vertically adjacent to the eighth internal electrode layer 1680), respectively.

Throughout the entire internal structure of the capacitor, those leads of the electrode plates which are vertically adjacent and have different polarities, are arranged to be always adjacent in a horizontal direction. Accordingly, the adjacent leads of different polarities interact to cancel magnetic fluxes thereby lowering the ESL of the capacitor. Furthermore, since each internal electrode layer has only one or two leads, the capacitor can have a suitable value of ESR which is not excessively low.

Furthermore, with the undivided internal electrode layers 1610, 1620, 1630, 1650, 1660 and 1670 arranged between the divided internal electrode layers 1640 and 1680 having the separator slit, it is possible to apply uniform pressure in pressing and sintering procedures while preventing delamination greatly.

Figure 25:
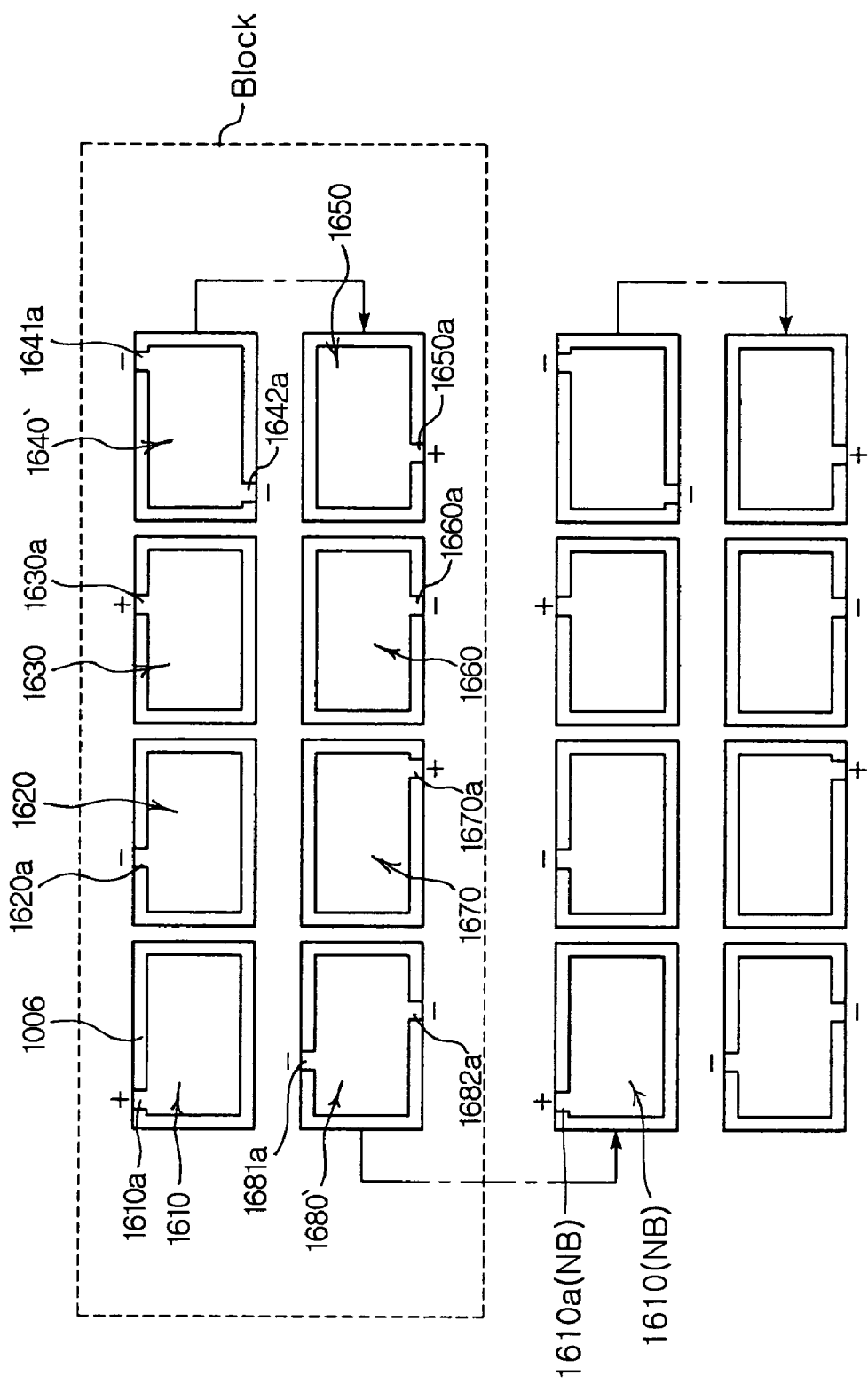

FIG. 25 illustrates an internal electrode structure of a variation to the multilayer chip capacitor shown in FIG. 24. The embodiment of FIG. 25 corresponds to a structure produced by connecting two divided, coplanar electrode plates 1641, 1642; 1681, 1682 of the internal electrode structure of FIG. 24 into one plate.

Referring to FIG. 25, first to eight internal electrode layers 1610, 1620, 1630, 1640', 1650, 1670 and 1680' are stacked sequentially into one block. Each of the internal electrode layers 1610 to 1680' is composed of one undivided electrode plate, which has at least one lead for providing a connection to an external electrode.

Each of the fourth and eighth internal electrode layers 1640' and 1680' has two leads 1641$a$, 1642$a$ or 1681$a$, 1682$a$ extended to opposite faces of a capacitor body. Each of the remaining first to third and fifth to seventh internal electrode layers 1610 to 1630 and 1650 to 1670 has one lead 1610$a$, 1620$a$, 1630$a$, 1650$a$, 1660$a$ or 1670$a$.

The leads 1610$a$ to 1630$a$ of the first to third internal electrode layers 1610' to 1630 are arranged horizontally in sequence. Likewise, the leads 1650$a$ to 1670$a$ of the fifth to seventh electrode layers 1650 to 1670 are arranged horizontally in sequence.

The lead 1641$a$ of the fourth internal electrode layer 1640' is arranged horizontally adjacent to the lead 1630$a$ of the third internal electrode layer 1630, and the lead 1642$a$ of the fourth internal electrode layer 1640' is arranged horizontally adjacent to the lead 1650$a$ of the fifth internal electrode layer 1650.

In addition, the lead 1681$a$ of the eighth internal electrode layer 1680' is arranged horizontally adjacent to the lead 1610$a$(NB) of the first internal electrode layer 1610 (NB) of an adjacent block NB. The lead 1681$b$ of the eighth internal electrode layer 1680' is arranged horizontally adjacent to the lead 1670$a$ of the seventh internal electrode layer 1670.

Throughout the entire internal structure of the capacitor, those leads of the electrode plates which are vertically adjacent and have different polarities, are arranged to be always adjacent in a horizontal direction. This as a result can suppress ESL enhancement factors. Furthermore, since each internal electrode layer has only one or two leads, the capacitor can have a suitable value of ESR which is not excessively low.

Furthermore, since each internal electrode layer is composed of one electrode plate (i.e., an undivided single structure), stepped portions (or thickness difference) rarely take place in fabrication process, thereby reducing associated negative effects. With no sacrifice in capacitance due to separator slits, this embodiment has a higher capacitance over those embodiments having the separator slits.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention. For example, the shape of internal electrode layers or the number of external electrodes may be modified or varied from those illustrated in the embodiments.

According to embodiments of the invention as set forth above, the capacitor ESR can be prevented from being lowered excessively and the ESL is further reduced. Accordingly, the stability of a power circuit is improved, target impedance is satisfied, and a power network can be designed stably. Furthermore, the ESR can be easily controlled by adjusting the length of a non-separator slit.

What is claimed is:

1. A multilayer chip capacitor comprising:
   a capacitor body having a plurality of dielectric layers stacked one atop another;
   a plurality of internal electrode layers separated from each other in the capacitor body by the dielectric layers, wherein each of the internal electrode layers has one or two leads extending to an outer surface of the capacitor body, and includes at least one coplanar electrode plate; and
   a plurality of external electrodes arranged on the outer surface of the capacitor body and electrically connected to the internal electrode layers via the leads,
   wherein the internal electrode layers constitute a plurality of blocks stacked repeatedly one atop another, each of the blocks including a plurality of the internal electrode layers which are arranged successively in a stacking direction;
   each of the electrode plates has one lead extending to a face of the capacitor body;
   the leads extending to the face of the capacitor body are arranged in a zigzag shape along the stacking direction; and
   the leads of vertically adjacent ones of the electrode plates having opposite polarities are arranged to be horizontally adjacent to each other,
   wherein the total number of the external electrodes is eight, and
   wherein each of the blocks includes six of the internal electrode layers which are arranged successively in the stacking direction.

2. The multilayer chip capacitor according to claim 1, wherein first to fourth external electrodes of the plurality of the external electrodes are arranged in sequence on a face of the capacitor body;
   first to sixth ones of the electrode plates are stacked sequentially one atop another in each block, each of the first to sixth electrode plates having one lead extending to the face of the capacitor body;
   the leads of the first to fourth electrode plates are connected to the first to fourth external electrodes, respectively; and
   the lead of the fifth electrode plate is connected to the third external electrode, and the lead of the sixth electrode plate is connected to the second external electrode.

3. The multilayer chip capacitor according to claim 1, wherein vertically adjacent ones of the leads which are connected to a common external electrode, are extended in different directions with a predetermined angle therebetween.

4. The multilayer chip capacitor according to claim 3, wherein the angle ranges from 45° to 135°.

5. The multilayer chip capacitor according to claim 1, wherein each of the internal electrode layers is divided into coplanar electrode plates by a separator slit, each of the electrode plates having a lead for electrically connecting the electrode plate to a corresponding one of the external electrodes.

6. The multilayer chip capacitor according to claim 5, wherein each of the electrode plates has one lead.

7. The multilayer chip capacitor according to claim 5, wherein each of the internal electrode layers is divided into a pair of the coplanar electrode plates by the separator slit.

8. The multilayer chip capacitor according to claim 7, wherein the pair of coplanar electrode plates have opposite polarities.

9. The multilayer chip capacitor according to claim 7, wherein the pair of coplanar electrode plates have the same polarity.

10. The multilayer chip capacitor according to claim 5, wherein the separator slit is extended in parallel with the longitudinal direction of the capacitor body.

11. The multilayer chip capacitor according to claim 5, wherein the coplanar electrode plates have the same area.

12. The multilayer chip capacitor according to claim 5, wherein the separator slit is extended in a diagonal direction of the capacitor body.

13. The multilayer chip capacitor according to claim 12, wherein the separator slits of the vertically adjacent internal electrode layers are extended in different diagonal directions.

14. The multilayer chip capacitor according to claim 1, wherein at least one of the internal electrode layers in each block is divided into coplanar electrode plates by a separator slit, and wherein each of the electrode plates has a lead for electrically connecting the electrode plate to a corresponding one of the external electrodes.

15. The multilayer chip capacitor according to claim 14, wherein each electrode plate of the divided internal electrode layer has one lead for electrically connecting to the external electrode.

16. The multilayer chip capacitor according to claim 14, wherein the separator slit is extended along the longitudinal direction of the capacitor body.

17. The multilayer chip capacitor according to claim 1, wherein each of the internal electrode layers comprises one undivided electrode plate, and each of the electrode plates has a lead electrically connecting to the external electrode.

18. The multilayer chip capacitor according to claim 17, wherein each of the electrode plates has two leads extending to opposite faces of the capacitor body; and
the leads extending to each of the opposite faces are arranged, on the respective face, in a zigzag shape along a stacking direction.

19. The multilayer chip capacitor according to claim 17, wherein vertically adjacent ones of the leads which are connected to a common external electrode, are extended in different directions with a predetermined angle therebetween.

20. The multilayer chip capacitor according to claim 19, wherein the angle ranges from 45° to 135°.

21. A multilayer chip capacitor comprising:
a capacitor body having a plurality of dielectric layers stacked one atop another;
a plurality of internal electrode layers separated from each other in the capacitor body by the dielectric layers, wherein each of the internal electrode layers has one or two leads extending to an outer surface of the capacitor body, and includes at least one coplanar electrode plate; and
a plurality of external electrodes arranged on the outer surface of the capacitor body and electrically connected to the internal electrode layers via the leads,
wherein the internal electrode layers constitute a plurality of blocks stacked repeatedly one atop another, each of the blocks including a plurality of the internal electrode layers which are arranged successively in a stacking direction;
each of the electrode plates has one lead extending to a face of the capacitor body;
the leads extending to the face of the capacitor body are arranged in a zigzag shape along the stacking direction; and
the leads of vertically adjacent ones of the electrode plates having opposite polarities are arranged to be horizontally adjacent to each other,
wherein the total number of the external electrodes is ten and
wherein each of the blocks includes eight of the internal electrode layers which are arranged successively in the stacking direction.

22. The multilayer chip capacitor according to claim 21, wherein first to fifth external electrodes of the plurality of the external electrodes are arranged in sequence on a face of the capacitor body;
first to eighth ones of the electrode plates are stacked sequentially one atop another in each block, each of the first to eighth electrode plates having one lead extending to the face of the capacitor body;
the leads of the first to fifth electrode plates are connected to the first to fifth external electrodes, respectively; and
the lead of the sixth electrode plate is connected to the fourth external electrode, the lead of the seventh electrode plate is connected to the third external electrode, and the lead of the eighth electrode plate is connected to the second external electrode.

23. A multilayer chip capacitor comprising:
a capacitor body having a plurality of dielectric layers stacked one atop another;
a plurality of internal electrode layers separated from each other in the capacitor body by the dielectric layers, wherein each of the internal electrode layers has one or two leads extending to an outer surface of the capacitor body, and includes at least one coplanar electrode plate; and
a plurality of external electrodes arranged on the outer surface of the capacitor body and electrically connected to the internal electrode layers via the leads,
wherein the internal electrode layers constitute a plurality of blocks stacked repeatedly one atop another, each of the blocks including a plurality of the internal electrode layers which are arranged successively in a stacking direction;
each of the electrode plates has one lead extending to a face of the capacitor body;
the leads extending to the face of the capacitor body are arranged in a zigzag shape along the stacking direction; and
the leads of vertically adjacent ones of the electrode plates having opposite polarities are arranged to be horizontally adjacent to each other,
wherein each of the internal electrode layers is divided into coplanar electrode plates by a separator slit, each of the electrode plates having a lead for electrically connecting the electrode elate to a corresponding one of the external electrodes, wherein the coplanar electrode plates have different areas, and wherein the separator slits of the vertically adjacent internal electrode layers have different in-plane positions.

24. The multilayer chip capacitor according to claim 23, wherein the separator slits of the vertically adjacent internal electrode layers have the same in-plane position.

25. A multilayer chip capacitor comprising:

a capacitor body having a plurality of dielectric layers stacked one atop another;

a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute a plurality of blocks stacked repeatedly one atop another, each of the blocks including a plurality of the internal electrode layers which are arranged successively in a stacking direction;

each of the electrode plates has one lead extending to a face of the capacitor body;

the leads extending to the face of the capacitor body are arranged in a zigzag shape along the stacking direction; and the leads of vertically adjacent ones of the electrode plates having opposite polarities are arranged to be horizontally adjacent to each other, wherein each of the internal electrode layers is divided into coplanar electrode plates by a separator slit, each of the electrode plates having a lead for electrically connecting the electrode plate to a corresponding one of the external electrodes, and wherein the separator slits of the vertically adjacent internal electrode layers are arranged to extend perpendicularly to each other.

26. The multilayer chip capacitor according to claim 25, wherein the separator slits include longitudinal separator slits extending along the longitudinal direction of the capacitor body and transverse separator slits extending perpendicularly to the longitudinal direction the capacitor body, the longitudinal and traverse separator slits alternating with each other along the stacking direction.

27. A multilayer chip capacitor comprising:

a capacitor body having a plurality of dielectric layers stacked one atop another;

a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute a plurality of blocks stacked repeatedly one atop another, each of the blocks including a plurality of the internal electrode layers which are arranged successively in a stacking direction;

each of the electrode plates has one lead extending to a face of the capacitor body;

the leads extending to the face of the capacitor body are arranged in a zigzag shape along the stacking direction; and the leads of vertically adjacent ones of the electrode plates having opposite polarities are arranged to be horizontally adjacent to each other, wherein at least one of the internal electrode layers in each block is divided into coplanar electrode plates by a separator slit, and wherein each of the electrode plates has a lead for electrically connecting the electrode plate to a corresponding one of the external electrodes, wherein the total number of the external electrodes is eight, and wherein each of the blocks includes six of the internal electrode layers arranged successively in the stacking direction, and three of the six internal electrode layers each are divided into a pair of the coplanar electrode plates.

28. The multilayer chip capacitor according to claim 27, wherein each of the blocks includes first to sixth ones of the internal electrode layers stacked sequentially;

each of the first, third and fifth internal electrode layers is divided into a pair of the electrode plates, each electrode plate of the divided internal electrode layers having one lead; and each of the second, fourth and sixth internal electrode layers is of a single undivided structure having two leads.

29. A multilayer chip capacitor comprising:

a capacitor body having a plurality of dielectric layers stacked one atop another;

a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute a plurality of blocks stacked repeatedly one atop another, each of the blocks including a plurality of the internal electrode layers which are arranged successively in a stacking direction;

each of the electrode plates has one lead extending to a face of the capacitor body;

the leads extending to the face of the capacitor body are arranged in a zigzag shape along the stacking direction; and the leads of vertically adjacent ones of the electrode plates having opposite polarities are arranged to be horizontally adjacent to each other, wherein each of the internal electrode layers comprises one undivided electrode plate, and each of the electrode plates has a lead electrically connecting to the external electrode, wherein the total number of the external electrodes is eight, and wherein each of the blocks includes first to sixth ones of the internal electrode layers stacked sequentially.

30. The multilayer chip capacitor according to claim 29, wherein first to fourth ones of the external electrodes are arranged sequentially on a face of the capacitor body;

the first to sixth internal electrode layers have first to sixth leads extending to the face of the capacitor body, respectively;

the first to fourth leads are connected to the first to fourth external electrodes, respectively; and the fifth lead is connected to the third external electrode, and the sixth lead is connected to the second external electrode.

31. A multilayer chip capacitor comprising:

a capacitor body having a plurality of dielectric layers stacked one atop another;

a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute a plurality of blocks stacked repeatedly one atop another, each of the blocks including a plurality of the internal electrode layers which are arranged successively in a stacking direction;

each of the electrode plates has one lead extending to a face of the capacitor body;

the leads extending to the face of the capacitor body are arranged in a zigzag shape along the stacking direction; and the leads of vertically adjacent ones of the electrode plates having opposite polarities are arranged to be horizontally adjacent to each other, wherein each of the internal electrode layers comprises one undivided electrode plate, and each of the electrode plates has a lead electrically connecting to the external electrode, wherein the total number of the external electrodes is ten, and wherein each of the blocks includes first to eighth ones of the internal electrode layers stacked sequentially.

32. The multilayer chip capacitor according to claim 31, wherein first to fifth ones of the external electrodes are arranged sequentially on a face of the capacitor body;

the first to eighth internal electrode layers have first to eighth leads extending to the face of the capacitor body, respectively;

the first to fifth leads are connected to the first to fifth external electrodes, respectively; and the sixth lead is connected to the fourth external electrode, the seventh lead is connected to the third external electrode, and the eighth lead is connected to the second external electrode.

33. A multilayer chip capacitor comprising:

a capacitor body having a plurality of dielectric layers stacked one atop another;

a plurality of internal electrode layers separated from each other in the capacitor body by the dielectric layers, wherein each of the internal electrode layers has one or two leads extending to an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute a plurality of blocks stacked repeatedly one atop another, each of the blocks including a plurality of the internal electrode layers which are arranged successively in a stacking direction;

each of the electrode plates has one lead extending to a face of the capacitor body;

the leads extending to the face of the capacitor body are arranged in a zigzag shape along the stacking direction; and the leads of vertically adjacent ones of the electrode plates having opposite polarities are arranged to be horizontally adjacent to each other, wherein each of the electrode plates has a non-separator slit extended from a side of the electrode plate toward the center to change a current flow inside the electrode plate, and wherein the separator slits and the non-separator slits are extended in parallel with the longitudinal direction of the capacitor body.

34. The multilayer chip capacitor according to claim 33, wherein corresponding ones of the non-separator slits in the vertically adjacent electrode plates have the same in-plane position.

35. The multilayer chip capacitor according to claim 33, wherein a pair of the coplanar electrode plates allow currents to flow through adjacent regions thereof in opposite directions.

36. The multilayer chip capacitor according to claim 33, wherein the vertically adjacent electrode plates allow current to flow therethrough in opposite directions.

37. A multilayer chip capacitor comprising:

a capacitor body of a plurality of dielectric layers stacked one atop another;

a plurality of internal electrode layers separated from each other in the capacitor body by the dielectric layers, wherein each of the internal electrode layers has one or two leads extending toward an outer surface of the capacitor body, and includes at least one coplanar electrode plate; and a plurality of external electrodes arranged on the outer surface of the capacitor body and electrically connected to the internal electrode layers via the leads, wherein the internal electrode layers constitute blocks stacked repeatedly one atop another, each of the blocks includes a plurality of the internal electrode layers which are arranged successively in a stacking direction; and the leads of vertically adjacent ones of the electrode plates having opposite polarities are arranged to be horizontally adjacent to each other, wherein the total number of the external electrodes is eight, and wherein each of the blocks includes first to eighth ones of the internal electrode layers stacked sequentially;

each of the fourth and eighth internal electrode layers has a pair of leads extending to opposite faces of the capacitor body; and each of the first to third and fifth to seventh internal electrode layers has one lead.

38. The multilayer chip capacitor according to claim 37, wherein the fourth internal electrode layer has a first lead extending to first one of the opposite faces of the capacitor body and a second lead extending to second one of the opposite faces of the capacitor body, and the eighth internal electrode layer has a third lead extending to the first face and a fourth lead extending to the second face;

the first lead is arranged horizontally adjacent to the lead of the third internal electrode layer, and the second lead is arranged horizontally adjacent to the lead of the fifth internal electrode layer; and the third lead is arranged horizontally adjacent to the lead of the first internal electrode layer of an adjacent block, and the fourth lead is arranged horizontally adjacent to the lead of the seventh internal electrode layer.

39. The multilayer chip capacitor according to claim 38, wherein the fourth internal electrode layer includes first and second electrode plates divided by a separator slit, the first electrode plate having the first lead, the second electrode plate having the second lead;

the eighth internal electrode layer includes third and fourth electrode plates divided by a separator slit, the third electrode plate having the third lead, the fourth electrode plate having the fourth lead; and each of the first to third and fifth to seventh internal electrode layers is undivided and has one lead.

40. The multilayer chip capacitor according to claim 38, wherein each of the internal electrode layers comprises one undivided electrode plate, each of the undivided electrode plate has a lead for electrically connecting to a corresponding one of the external electrodes.

* * * * *